(12) United States Patent
Hoshino et al.

(10) Patent No.: US 6,396,506 B1
(45) Date of Patent: May 28, 2002

(54) DISPLAY OPERATION METHOD TO CHANGE THE NUMBER OF IMAGES TO BE DISPLAYED AND TO INDEPENDENTLY CHANGE IMAGE DIRECTION AND ROTATION OF EACH IMAGE

(75) Inventors: Takeshi Hoshino, Kodaira; Yoshimasa Yokoyama, Kokubunji; Takeshi Minemoto, Sagamihara; Masahide Aoki, Ryugasaki; Atsuo Osawa; Kunio Umehara, both of Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/142,831

(22) PCT Filed: Mar. 15, 1996

(86) PCT No.: PCT/JP96/00678

§ 371 (c)(1),
(2), (4) Date: Sep. 15, 1998

(87) PCT Pub. No.: WO97/35248

PCT Pub. Date: Sep. 25, 1997

(51) Int. Cl.[7] .................................................. G09G 5/34
(52) U.S. Cl. ....................................... 345/650; 345/658
(58) Field of Search ............................... 345/126, 1, 2, 345/437, 60, 649, 655, 656, 657, 658, 650

(56) References Cited

U.S. PATENT DOCUMENTS 5,539,479 A  *  7/1996  Bertram 6,008,581 A  * 12/1999  Ochiai et al.
6,204,845 B1 *  3/2001  Bates et al.

FOREIGN PATENT DOCUMENTS

| JP | 181437 | 7/1993 |
| JP | 05-257636 | * 10/1993 |
| JP | 059813 | 4/1994 |

* cited by examiner

*Primary Examiner*—Chanh Nguyen
(74) *Attorney, Agent, or Firm*—Antonelli, Terry, Stout & Kraus, LLP

(57) ABSTRACT

A display device and operation method thereof for displaying images processed on an image processing apparatus on a horizontally installed, upward facing display screen with the operation method for said display device comprising; a step for specifying the number of screens for display on the display screen, a step for displaying image information on a screen with a predetermined image direction in said display device based on the specified number of screens, a step to change the established display direction, a step to display said screen based on instructions for changing the display direction; and further comprising a step to specify the number of screens for display on said display screen and the direction of said display screen, a step to display an image on the display screen based on the specified number of screens and specified direction of the display screen thus allowing an ideal screen to be provided on a single display device for a plurality of users by changing the direction of the screen along with the number of screens for display. A user's own screen currently in use, can further be changed to face other users thus permitting joint use of information shown on the display screen of the display device.

10 Claims, 34 Drawing Sheets

FIG. 6
(a)
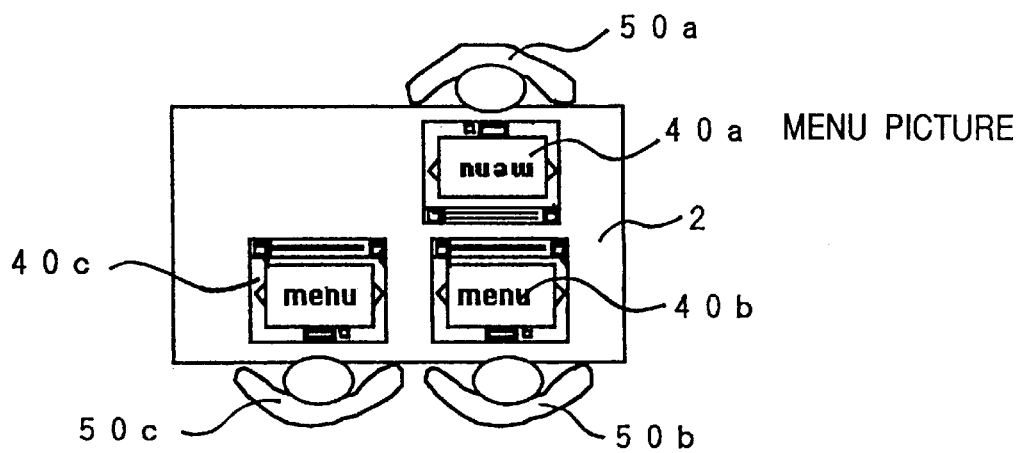
MENU PICTURE
(b)
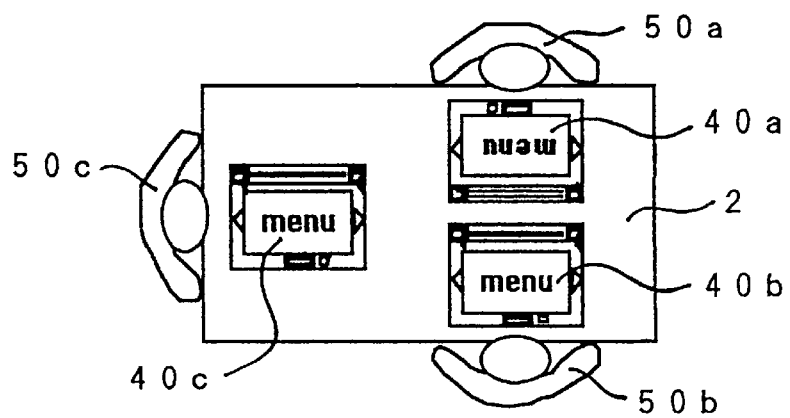
(c)
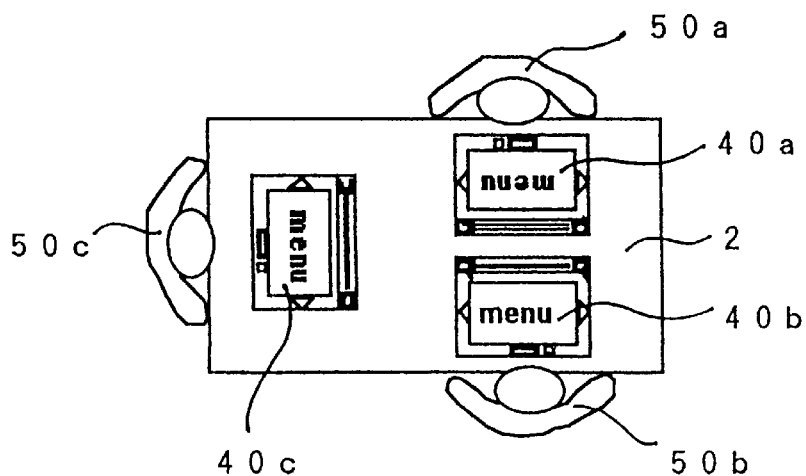

FIG. 11
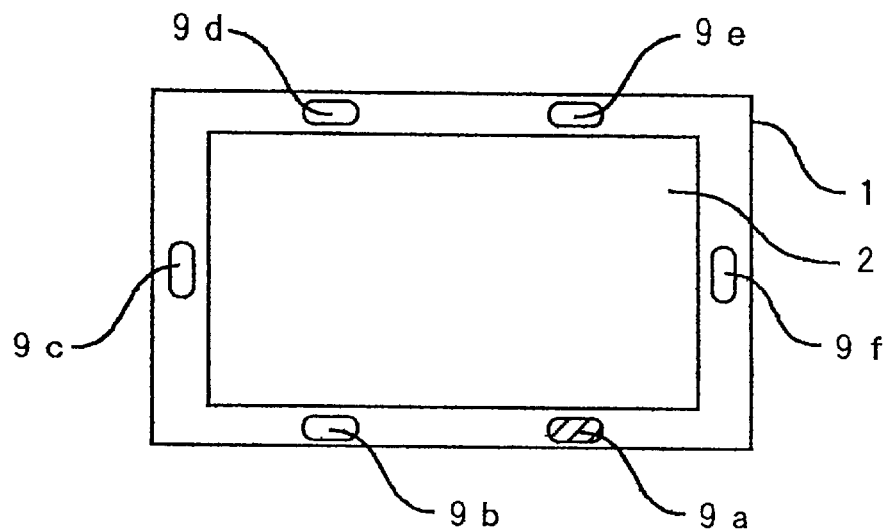
FIG. 12
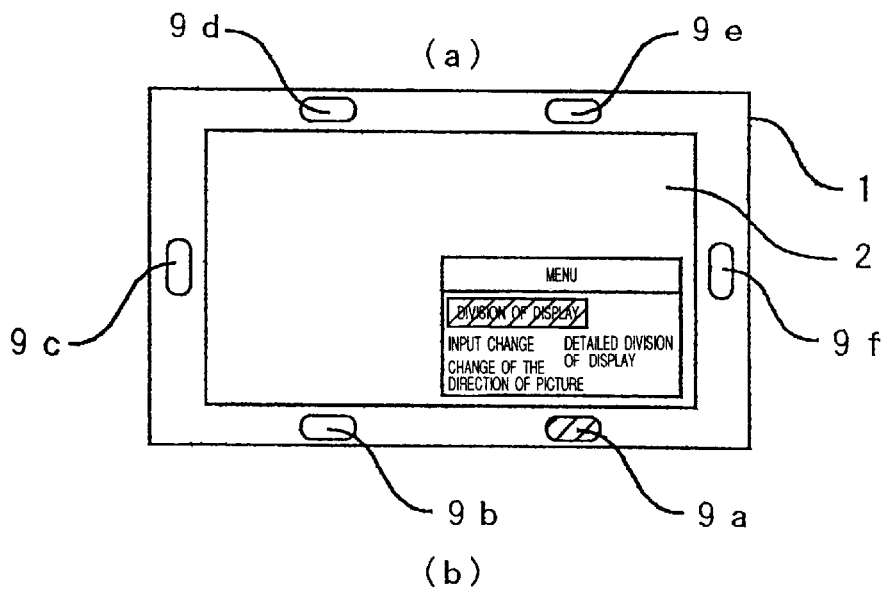
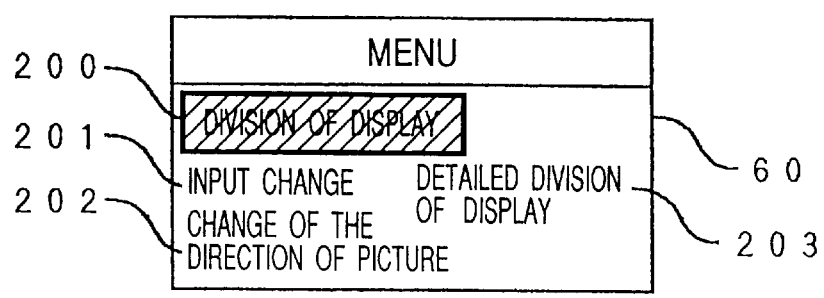

FIG. 33
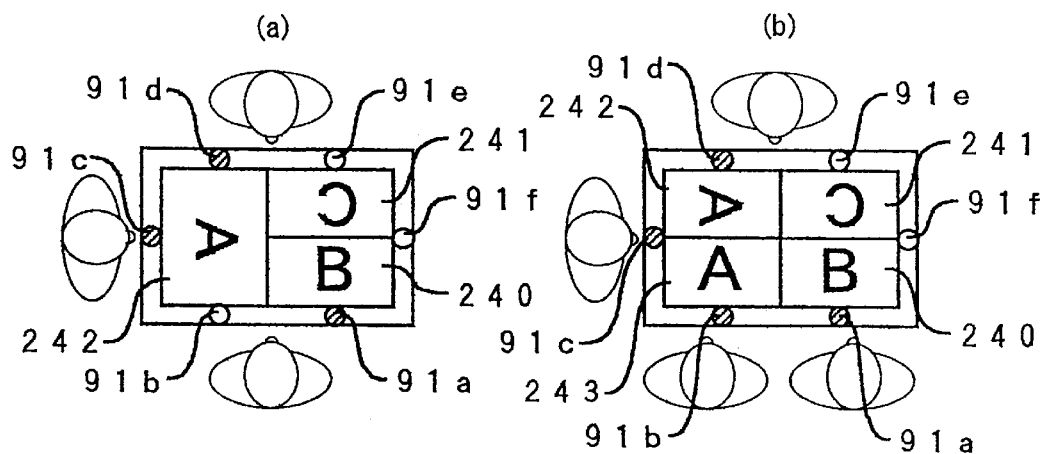
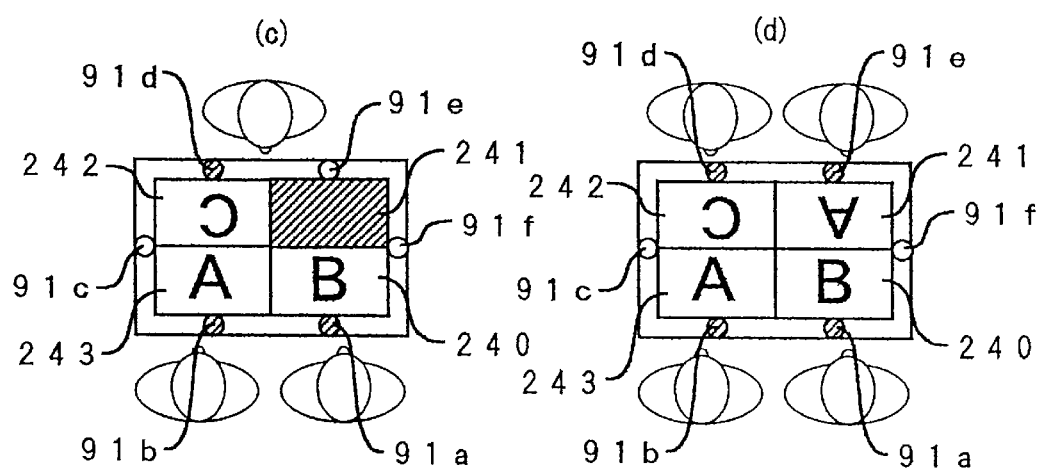

(g)

DISPLAY OPERATION METHOD TO CHANGE THE NUMBER OF IMAGES TO BE DISPLAYED AND TO INDEPENDENTLY CHANGE IMAGE DIRECTION AND ROTATION OF EACH IMAGE

BACKGROUND OF THE INVENTION

1. Field of the Invention

This invention relates to a display device and operation method thereof, utilized in information processing devices and information terminal devices such as computers and in audio visual equipment such as household televisions and video tape recorders, etc.

2. Description of Related Art

Increasing progress in reducing the size of information terminals such as computers has allowed these computers or information terminals to be carried to other locations and used. Along with reducing the size of these information terminals, the device for reproducing the information was a display device operating by means of a directly viewable cathode ray tube which was large in size and heavy. Display devices therefore shifted to use of liquid crystal displays which were thin, light weight and consumed less power therefore providing information terminals which were much easier and convenient to transport.

Further, increasing progress in the digitalization of for instance, audiovisual equipment and telephone circuits allowed information for reproduction on display devices such as information terminals, to also consist of multimedia information such as visual information from televisions, video tape recorders, electronic cameras and video telephones as well as the usual letter information from computers. (Hereafter, letter or character information and visual information are given a common term of image information.)

With the advent of multimedia information, the display devices had to cope with demands for larger screens and multimedia processing functions. These demands have focused even more attention on thin, light weight and low power liquid crystal displays.

On the other hand, even the largest liquid crystal displays have drawbacks such as that screen dimensions (dimensions of opposing corners) are at most a maximum of 21 inches and a narrow visual angle (range from which roughly the same image can be seen as from directly in front of the image of the display device).

However, the problem of a narrow viewing angle was resolved by moving the liquid crystal molecules horizontally in a lateral electrical field relative to the glass substrate to achieve a wide viewing angle. The need for an increased screen size was resolved by means of a plasma display panel utilizing luminous plasma and fluorescent material.

Therefore the liquid crystal display and plasma display panels became capable of displaying highly precise screen information even when used parallel to a table or floor surface.

Also household products such as television capable of showing multiple screens were proposed. Further, information terminals such as computers were proposed for simultaneously opening a plurality of windows on a single screen and then displaying various information on the respective windows.

Amidst this environment, the terminal devices of the conventional art changed from just individual use to joint use of information provided from the terminal devices. For instance, display devices were preferred for use at electronic conferences among businessmen from different locations or at conferences at once location.

However, in these display devices of the convention art, the main objective was showing multiple screens and was provided only to allow a plurality of people to view the single display from one direction and therefore was not suited for use by a plurality of people viewing the display from opposite directions.

Whereupon, methods for controlling the display direction of the image information and displaying the information so that people could utilize the respective screen from various directions were designed utilizing methods such as inverting the top and bottom of the image information displayed on a single display device or by utilizing a plurality of display devices.

A method for inverting the image information as described above was proposed in Japanese Laid-open Patent No. Hei 4-326152 (1992) and in Japanese Laid-open Patent No. Hei 7-175444 (1995).

The above mentioned method for inverting the image information displayed on a single display screen could not provide an angle suitable for viewing by a plurality of people at the same time so that the image information had to be inverted to an extent needed by the people watching the display, thus making operation difficult.

Further, the above mentioned method utilizing a plurality of display screens required a plurality of memory storage circuits and a plurality of display screens making the display device large and thus presenting problems in terms of size, weight and power consumption.

SUMMARY OF THE INVENTION

Accordingly, it is an object of the present invention to provide a display device for displaying a plurality of image information suitable for a plurality of people on a single screen configured for use by a plurality of people around the periphery of the horizontally installed display by utilizing a thin, light weight display device consisting of a liquid crystal display or plasma display panel.

It is a further object of this invention to provide an operation method to display a plurality of image information on a single display screen and to allow screens to be split up according to the number of users, so that no single user can monopolize the entire display device.

The display device of this invention is configured such that a plurality of image information is displayed on the horizontally installed display unit and each image screen that is displayed is made to face forwards and backwards for the users positioned around the display screen.

Further, the direction the image information screen faces and how the image information screens are split is set beforehand and the image information screen can be shifted even after information was once shown.

Accordingly, even if a plurality of users are using the display device, a single display device can be used by splitting the screens up to match the number of users without having to prepare a plurality of individual display devices.

Also, this horizontally installed display device receives externally provided image information, has a menu screen as a method for displaying a plurality of image information screens on the display screen, is configured to be capable of setting the number of split screens on the image information screen and the orientation of the image information screen being displayed, and finally is further configured to allow selection of image information that was input.

Consequently, the image information screen can be easily split into other screens when the need occurs due to a change in the number of users so that an ideal number of image information screens can constantly be provided to match the number of users.

Still further, since much image information can be shown on a plurality of image information screens, a large amount of information can be checked at one time and the orientation of the display device can be changed to display one's own image information to another user in an opposite position, further allowing joint use of information.

Yet further, the display device is comprised of a plurality of operating means for displaying image information screens on the display device and splitting up the image information display screen so that when only one user is present he may use the display screen and when there is a change in the number of users, the information screen can be split up into additional screens so that a single display device can be utilized by a plurality of users.

Even further, the display device is comprised of an operation means to specify movement of the image information screen and an operation means to select the type of input image information on the image information screen so that direct instructions are sent to an image information screen needing a change, operating errors can be prevented and changes can be executed quickly.

BRIEF DESCRIPTION OF THE DRAWINGS

FIGS. 6(a) (b) and (c) are examples expressing the user seating status and the screen display per the operation shown in FIG. 5.

FIG. 11 is an example showing the status of the display screen when the power was turned on as shown in FIG. 10.

FIG. 12 shows the display screen status when the split screen menu was selected in FIG. 10.

FIG. 33 is a drawing showing the status when operated by three persons as well as four persons.

DETAILED DESCRIPTION OF THE INVENTION

The present invention will now be described in detail while referring to the accompanying drawings.

Figure 1:
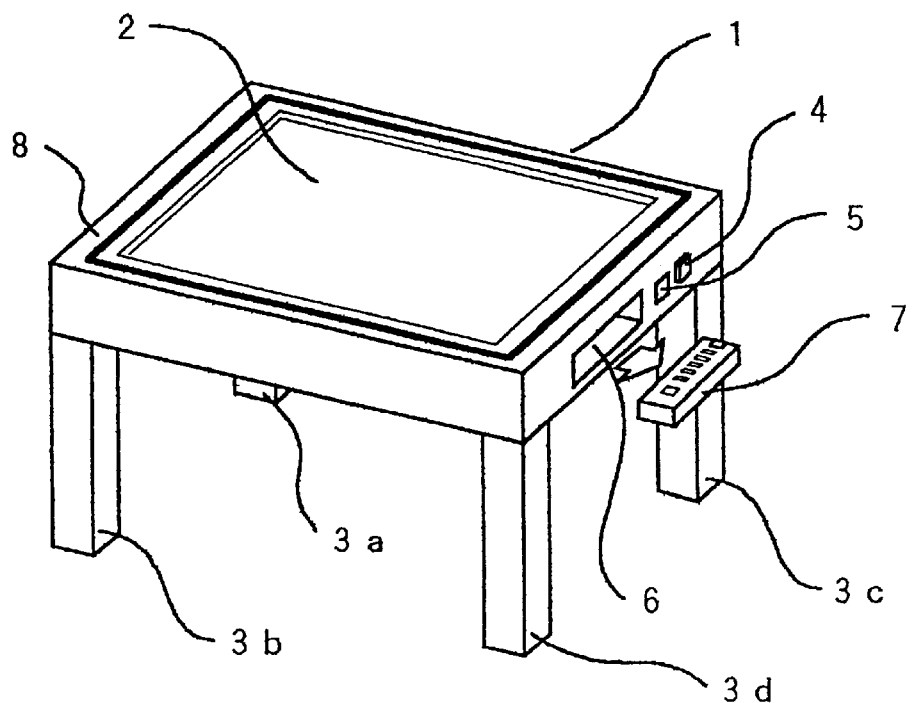
FIG. 1 is an oblique view of the display device of the first embodiment of this invention.
Figure 2:
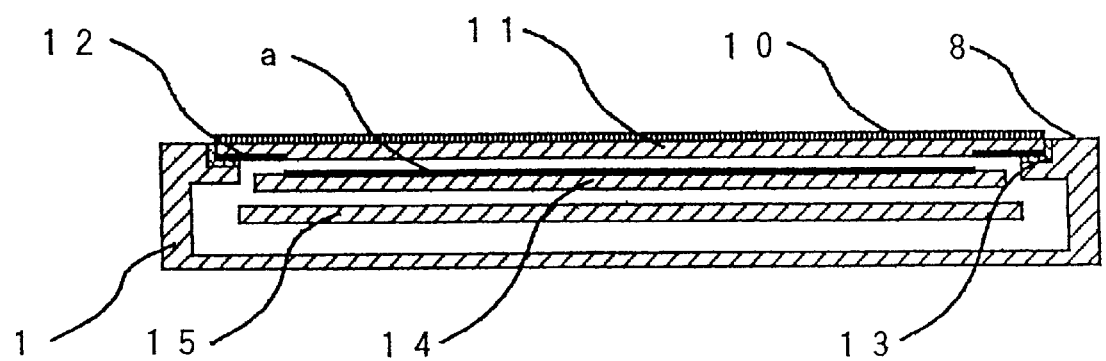
FIG. 2 is a cross sectional view of the panel of the embodiment shown in FIG. 1.
Figure 3:
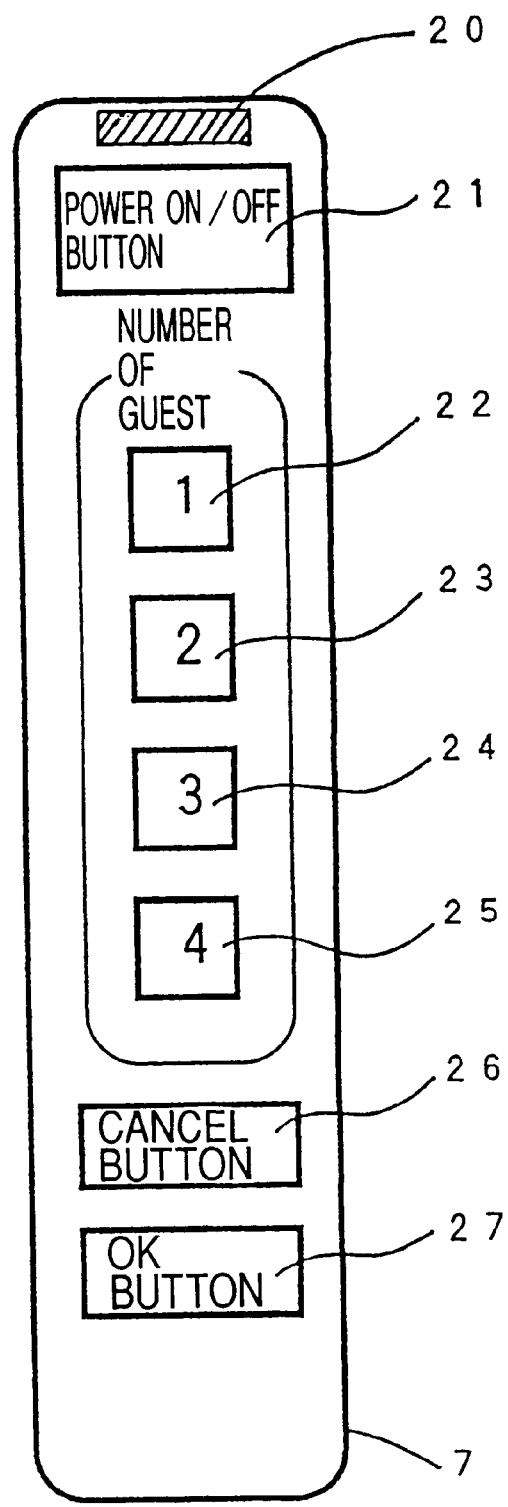
FIG. 3 is a front view of the remote controller for the embodiment shown in FIG. 1.
Figure 4:
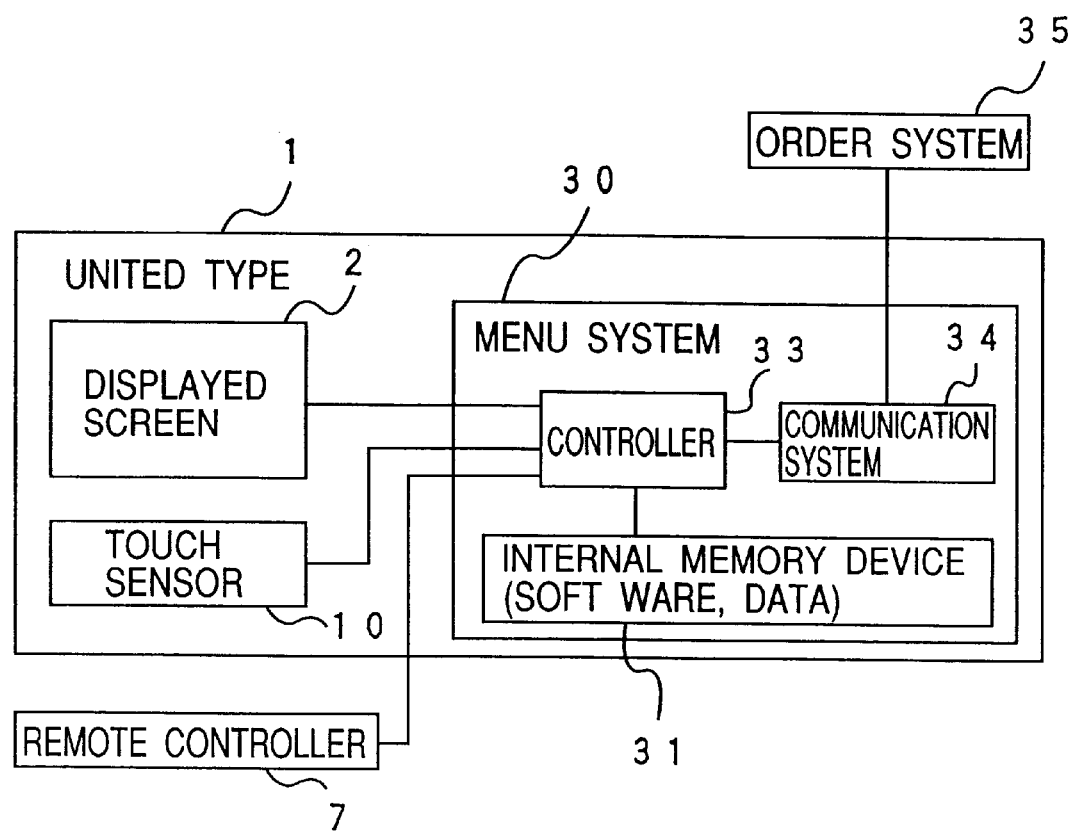
FIG. 4 is a block diagram showing the layout of the display device of the first embodiment of this invention.

FIG. 1 is an oblique view of the display device of the first embodiment of this invention. FIG. 2 is a cross sectional view of the panel of the embodiment shown in FIG. 1. FIG. 3 is a front view of the remote controller for the embodiment shown in FIG. 1. FIG. 4 is a block diagram showing the functional layout of the display device of the first embodiment of this invention.

In FIG. 1 through FIG. 4, the display device of the first embodiment of this invention is comprised of a panel 1 and legs 3a through 3d to support the panel 1. This panel 1 has an aperture in the upper portion to expose the display screen 2.

A power switch 4, a remote control light sensor 5 and a remote control pocket 6 are mounted on the side of the panel 1. The display screen 2 is comprised of a touch sensor 10, a protective transparent plate 11 made from reinforced glass or reinforced plastic, a plasma display panel 14 and main circuit board 15 which other than the touch sensor 10 are housed inside the panel 1.

The plasma display panel 14 is comprised of a polarized filter, a front plate, a transparent electrode, a liquid crystal, a partition, a fluorescent element, an inductive layer, a data electrode and a backlight not shown on the drawing.

The plasma display panel 14 is provided with a display range "a" in which to prevent image information and others other than in this range "a" are installed with a masking 12. A shield material 13 made from rubber or plastic silicone is mounted between the touch sensor 10, the protective transparent shield 11, the masking 12 and the panel 1.

The installation of the protective transparent shield 11 prevents scratches and damage to the plasma display panel 14 even if an eating utensil, an ashtray or table ornament is placed directly on the display surface 2. Further, the shield material 13 prevents items such as water, food scraps and dirt from penetrating into the interior of the panel 1.

Besides the display device 2, the panel 1 is also comprised of a menu system 30 and a power supply unit not shown on the drawing.

The menu system 30 receives an input from the touch sensor 10 or instructions from the remote controller 7 described later and is further comprised of a controller 33 to control operation, an internal memory device 31 to store image information data for display on the display screen 2, and a communications unit 34 to externally convey control information from the controller 33 and the internal memory device 31.

Separate from this panel 1, the remote controller 7 is comprised of an LED 20, a power button 21, a USERS number buttons 22–25, a cancel button 26 to cancel the previous setting made with the USERS number buttons 22–25, and an Enter button 27 to set the display screen status.

Further, in order to announce orders from customers such as in the institution kitchen, the order system 35 is connected by cable or telephone line to the panel 1.

In this embodiment, the menu system was described as being housed in the panel 1 however the menu system 30 may also be installed separately. In such a case, the number of structural parts housed in the panel 1 can be reduced so that a thin and light weight display device can be provided.

Also, in the above description, the legs 3a through 3d were attached to the panel 1 however this invention need not be limited to this arrangement and the panel 1 may for instance be mounted on a surface such as a table without utilizing the 3a through 3d.

A brief description of this embodiment was related above. Next a detailed description of the operation of this embodiment will be related.

Figure 5:
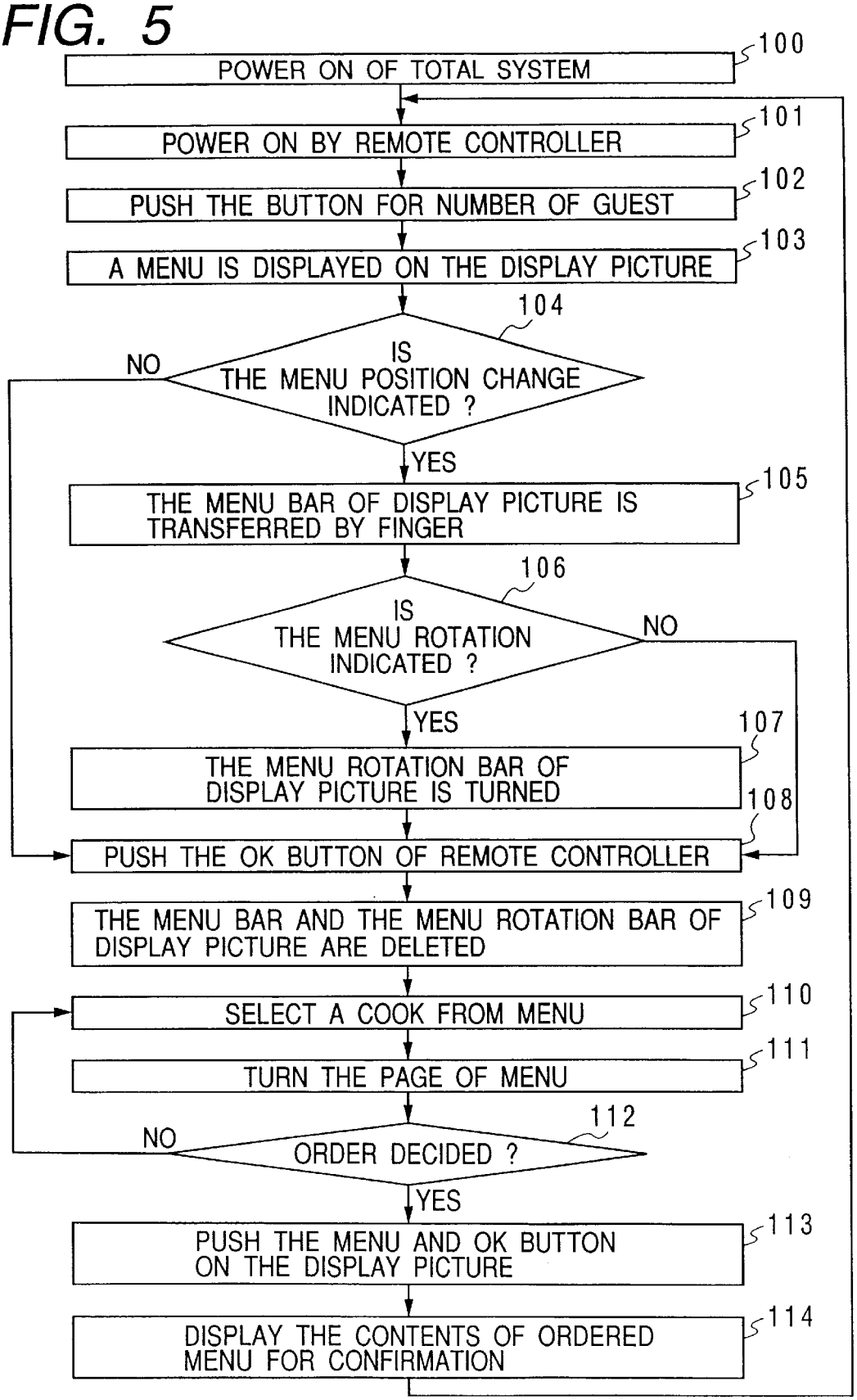
FIG. 5 is a flowchart showing the operation of the embodiment shown in FIG. 1.
Figure 7:
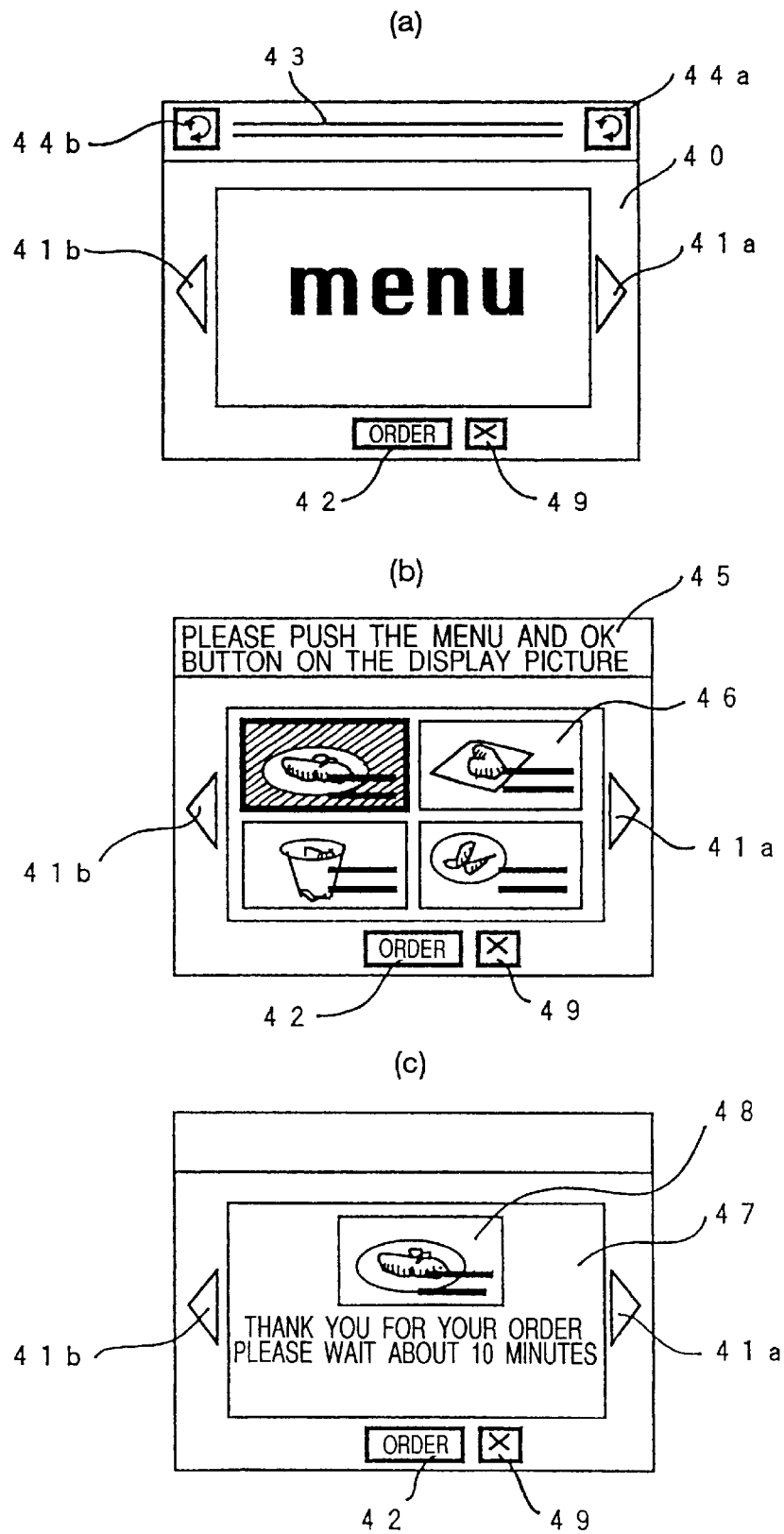
FIGS. 7(a) (b) and (c) are examples of image display information for the operation shown in FIG. 5.

FIG. 5 is a flowchart showing the operation of the embodiment shown in FIG. 1. FIGS. 6(a) (b) and (c) are examples expressing the user seating status and the screen display per the operation shown in FIG. 5. FIG. 7 is examples of image display information for the operation shown in FIG. 5.

In the operation of FIG. 5 through FIG. 7, first the power switch 4 is turned on (step 100) and the arrival of customers to the store awaited. When the customer enters the store, the remote controller 7 store in the remote control pocket 6 is extracted and the power button 21 pressed while aimed at the remote control light sensor 5 which turns on the power to the display screen 2 (step 101).

The power switch 4 of the panel 1 has the function of preheating the plasma display panel 14 so that image information can be immediately shown on the plasma display panel 14 while in a satisfactory state. The power button 21 has the role of supply the main power to the plasma display panel 14. The power switch 4 and the power button 21 prevent consumption of any more than the necessary amount of power so wastage of electrical power is prevented and operation is economical.

When the number of customers 50 is quickly found at this time, and User Count buttons 22–25 pressed to encode the number of customers (step 102), on the display screen 2, the selected number of customers and a matching number of menu screens 40 is displayed to face both upright and inverted to match the seated customers 50 (step 103).

FIG. 6 displays the status in step 103 with the number of customers 50 visiting the store being three and this having been input with the User Count button 24. The customer 50a and the customer 50b are seated facing each other, and the customer 50c is seated next to the customer 50b. In the display placement shown in FIG. 6(a), when the User Count button 24 is pressed per a standard placement, designated image information is automatically displayed from the image information recorded in the internal memory device 31.

In this case, the orientation of the menu screen 40a provided for the customer 50a is placed to be higher than the orientation for the customer 50a on the opposite side. The menu screens 40b and 40c provided for the customers 50b and 50c are displayed in the same way.

Though not shown in the drawing, when input by the User Count button 25, the menu screen 40 for customers other than 50a, 50b and 50c is automatically provided with the same orientation as the menu screen 40a in the extra space adjacent to the customer 50a.

Also not shown in the drawing, when input by the User Count button 22, only the menu screen 40a is automatically displayed. When input by the User Count button 23, only the menu screens 40a, 40b are automatically displayed.

Here, if a mistake is made in checking the number of customers visiting the store, the mistaken input can be canceled with the cancel button 26 and the correct figure then entered with the User Count buttons 22–25.

Next, check if the customers 50a, 50b, and 50c are correctly seated to match the automatically displayed menu screens 40a, 40b and 40c (step 104). If correctly seated, press the Enter button 27 to store the placement of the menu screens 40a, 40b and 40c (step 108).

In FIG. 6(b), the customer 50c is seated on a side of the panel 1 different from that of the seated customers 50a and 50b. Since the customer 50c is seated differently versus the automatically shown menu screen 40c, the menu bar 43 for the menu screen 40c is dragged with a finger and the menu screen 40 position moved to the correct position and the finger then released from the menu bar 43 (step 105).

This menu bar 43 is shown with two bars in a specifiable range. Operation is possible by specifying this range with a finger.

Next, a check is made as to whether changing the orientation (direction) of the menu screen 40c is necessary (step 106). When changing the orientation is necessary, drag either one of the rotation bars 44a or 44b with fingers, rotate the menu screen 40c to the desired orientation and release the finger when at the correct position (step 107). The same operation can be specified for either one of the rotation bars 44a or 44b.

Next, a check is made to determine if the menu screen 40c is set correctly with respect to the customers 50c as shown in FIG. 6(c). If correct, the Enter button 27 is pressed to set the placement for the menu screens 40a, 40b and 40c into the memory (step 108).

Also, in step 106, when there is no need to rotate the memory screen 40c, step 106 may be omitted and the operation of step 108 performed.

The menu screens 40a, 40b are both comprised of a menu bar 43 and the rotation bar 44a and 44b so that when movement and rotation of the menu screens 40a and 40b is necessary, the operation of steps 107 through steps 108 can be performed.

The operation up until now has been performed by store personnel such as the waiter or waitress however when there is a reservation, the operation in steps 100 through steps 108 can be performed beforehand. In such a case, the customers 50a, 50b and 50c can be speedily seated.

Up until now the store personnel had the tasks of bringing a printed menu to the customer when he arrived at the store, offering the customer the menu and taking his order and once the order was taken storing the menu in a separate location. However in this embodiment, the menu is not brought to the customer so that the waiter and waitress can quickly greet the customer as he enters the store and services such as pulling out the chair for the customer can be quickly performed.

Further, in the above description the waiter and waitress performed steps 100 through 108 however, the customers 50a, 50b and 50c may perform these tasks by themselves by means of installing the remote controller 7 in the frame 8 of the panel 1. In this case the tasks for the waiter and waitress would then only be greeting the customers and guiding them to their seats and the workload imposed on the waiter and waitress could therefore be reduced.

Once the placement of the menu screens 40a, 40b and 40c has been set, these menu screens 40a, 40b and 40c can be operated independently. As shown in FIG. 7(b), the menu screens 40a, 40b, and 40c are erased (step 109) and a message 45 with operating instructions and a menu 46 are offered to the customer on the menu screen 40.

Once the menu 46 has been displayed, the customers 50a, 50b and 50c operate the screens independently and make an order from the menu 46.

The customers 50a, 50b and 50c select (step 110–step 111) the desired item by turning the pages of the menu 46 by using the page buttons 41a, and 41b. When an item to be ordered is not on the page being displayed, the page button 41a is used to display the next page or return to the preceding page of the menu 46 and eventually select a desired item (step 112).

Once the image information for the desired item is found on the display, the customers 50a, 50b and 50c touch that displayed portion with a finger and press the set button 42 (switch 113). On the menu 46, the area with image information touched by the finger is distinguished from among other items and then displayed with oblique lines, as inverted information or is made to flash, etc.

Once an order for an item is entered, the order item 48 is displayed on the set menu 47 so that the order entry is checked (step 114). The cancel button 49 is pressed in order to change the entry or when the entry was wrong, and the operation of steps 110 through step 114 is performed.

Also, when a change is needed in steps 110 through steps 112, the cancel button 49 is pressed so that the order will not be sent.

When ordering a plurality of the same item, the operation in step 113 through 114 may be performed just to match the number of orders. When ordering different items, the operation of steps 110 through steps 114 is repeated to simultaneously order a plurality of the same or to order a plurality of different items.

Once the above operation for setting the order items has been completed, the order items along with identification information such as table numbers recorded beforehand in the panel 1 are sent by way of communications device 34 to the order system 35 installed in a space such as in the kitchen, a list of the ordered items is then printed or shown on a display and the preparation of the food then begins.

If the order system 35 is provided with a function to print a receipt listing the total cost of the items on the list that was ordered, then once the ordered items have been delivered to the customer, this receipt can then be presented to the customer. The order system 35 can be achieved with known technology of the conventional art.

After the customer has left, the power button 21 is pressed and the plasma display panel 14 is set to preheat status.

In this embodiment it was described that from one to four menu screens 40 could simultaneously be displayed and on the menu 46, four types of items could be displayed however this invention is not limited to this number and the size of the image information can be reduced or the size of the display screen 2 can be enlarged so that more image display information may be displayed.

Further, in the menu 46 not shown in the drawing, the method for preparing the ordered food items and information such as the number of glasses required may also be input. In such cases, a full order can be received without the waiter or waitress having to go to the customer's table.

In this arrangement, a plurality of image information is displayed on a single display screen 2 and the orientation (or direction) of the image information can be changed so that even if a plurality of users enclose a single display screen 2, image information can be made to face as needed to match each of these users.

Also, once the placement of the menu screen 40 has been set to show to the seated customers, the order from the customer 50 can be mechanically received so that there is no need to go to the table to take the customer's order, thus reducing the labor required of the waiter and waitress. Additionally, there is no need for the customer 50 to call the waiter or waitress which eliminates a source of potential bother or irritation.

The above description related the receiving and display of the order of the order items 48 on the set menu 47 however this invention is not limited to this arrangement and besides the image information with the above ordered item 48 and message, various image information such as an introduction to the store and the store's surroundings can be stored in the internal memory device 31 and shown on the display 2 as a store service while the customer is awaiting the arrival of the waiter or waitress or the ordered item.

Next, the second embodiment of this invention is explained while referring to the accompanying drawings. Detailed explanations involving parts identical to those in the first embodiment of this invention having the same names and same symbols are omitted.

Figure 8:
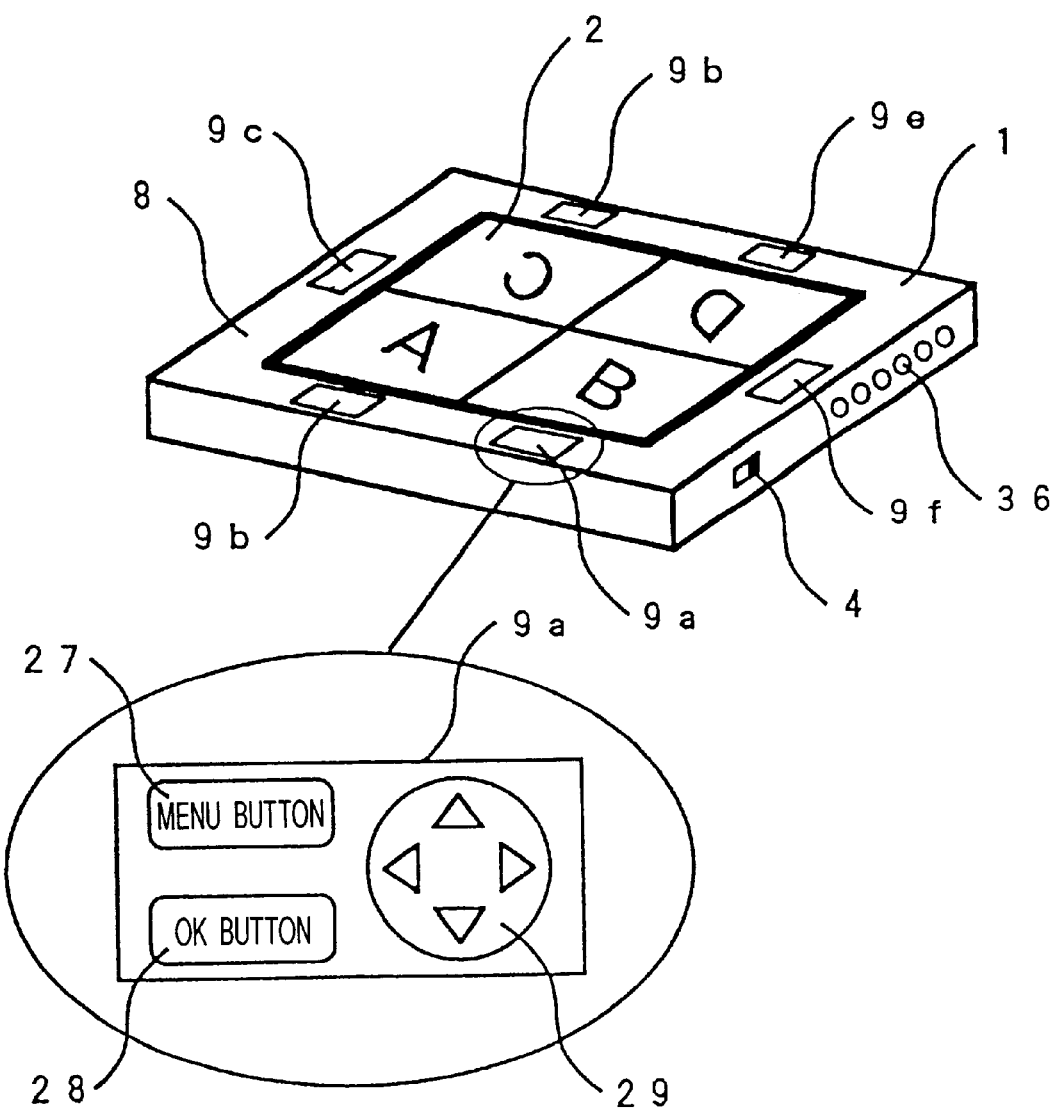
FIG. 8 is an oblique view of the display device for the second embodiment of this invention.
Figure 9:
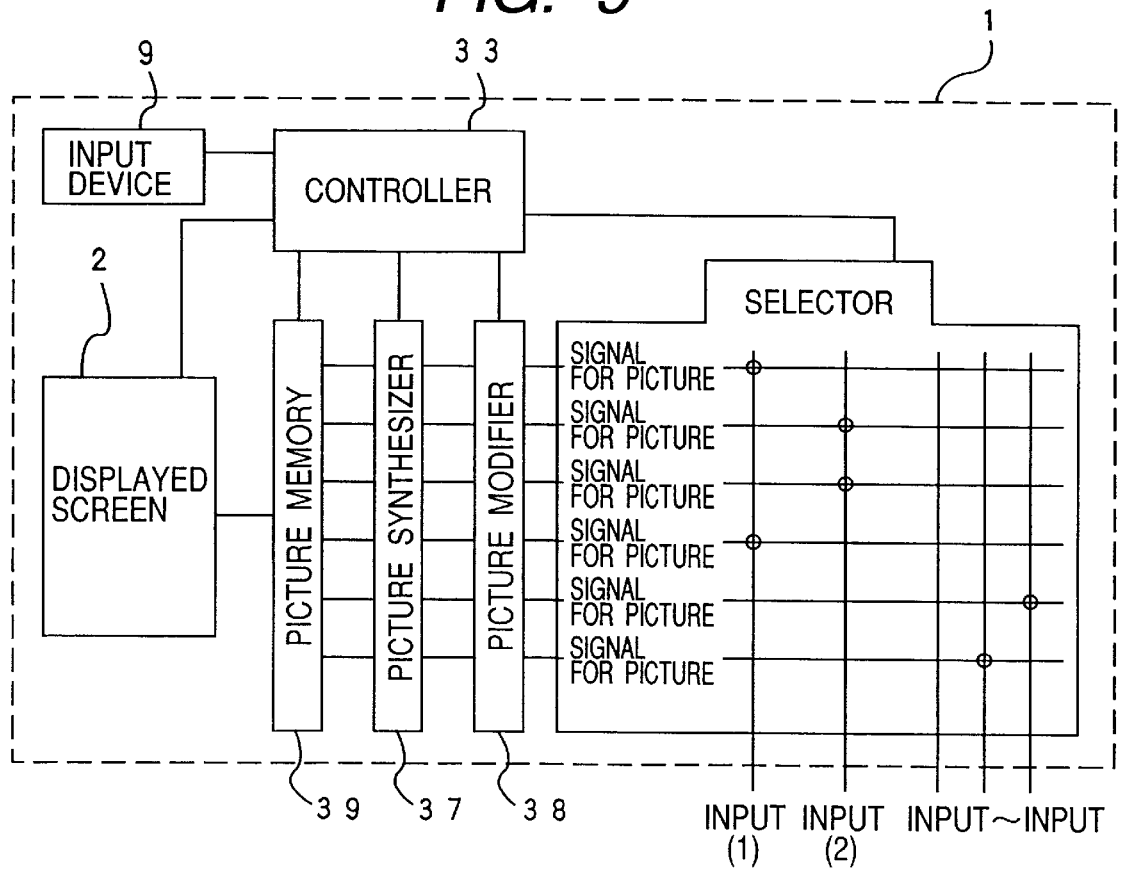
FIG. 9 is a block diagram showing the layout of the display device of the second embodiment of this invention.

FIG. 8 is an oblique view of the display device for the second embodiment of this invention. Also, FIG. 9 is a block diagram showing a functional layout of the display device of the second embodiment of this invention.

A power switch 4 and image information terminals 26 are installed on the side of the panel 80. The operating sections 9a through 9f which function as input devices are installed in a frame 8 of the panel 80. The respective menu buttons 27, menu set buttons 28 and the cursor movement buttons 29 are installed in the operating sections 9a through 9f. These menu buttons 27, menu set buttons 28 and the cursor movement buttons 29 are comprised of touch buttons having a sheet configuration.

Besides the operating sections 9a through 9f and the display device 2, the panel 80 also contains; a controller 33 to control operation based on input from the operating sections 9a through 9f, a select function 60 to select image information input from the input terminals 36, an picture modifier (image information processor) 38 to convert the video signals and PC signal (RGB signals) input from buttons 25 into a standard format and further into an image of a specified size, position and angle, a picture synthesizer 37 to synthesize a plurality of image information into one piece of image information, an image memory 39 to store the modified and synthesized image information, and a power unit not shown in the drawing.

As is related later on, this embodiment is capable of displaying a plurality of image information on the display screen 2. Each image information input for display is selected and processed for the specified size and orientation (direction) in the picture modifier (image information processor) 38 and the picture synthesizer 37 and after being temporarily stored by way of the controller 33 in the image memory 39, is displayed on the display screen 2.

Also, in the select function 60, number of image information types input from the input terminals 6 was described as six types, however this invention is not limited to this arrangement and at least two types or more may be used.

A brief description of the above embodiment has now been related. Next, a detailed description of the operation of this embodiment will be explained.

Figure 10:
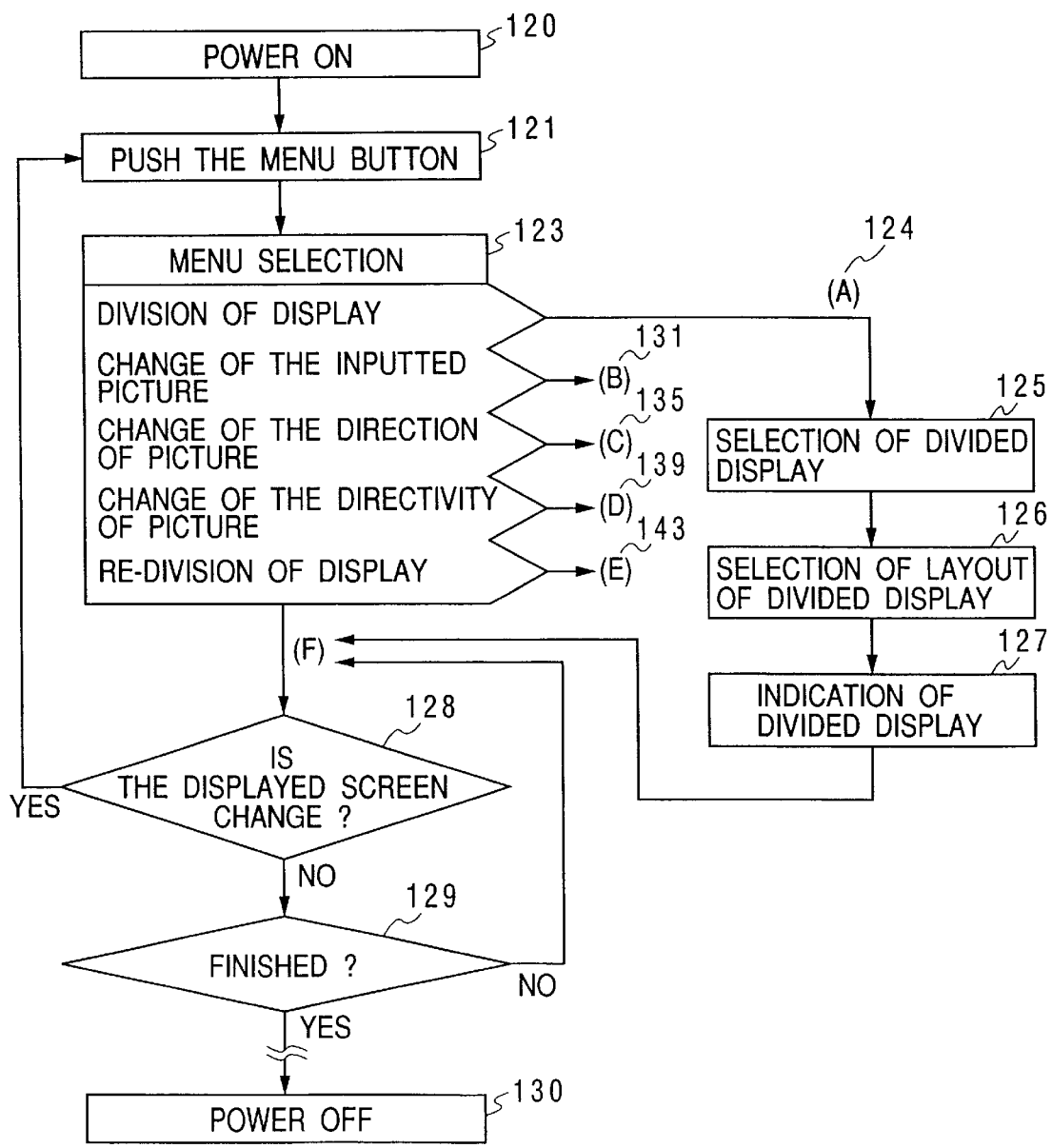
FIG. 10 is a flowchart showing the operation of the embodiment shown in FIG. 8.

FIG. 10 is a flowchart showing the operation of the embodiment shown in FIG. 8. Also, FIG. 11 is an example showing the status of the display screen when the power was turned on as shown in FIG. 10.

Figure 13:
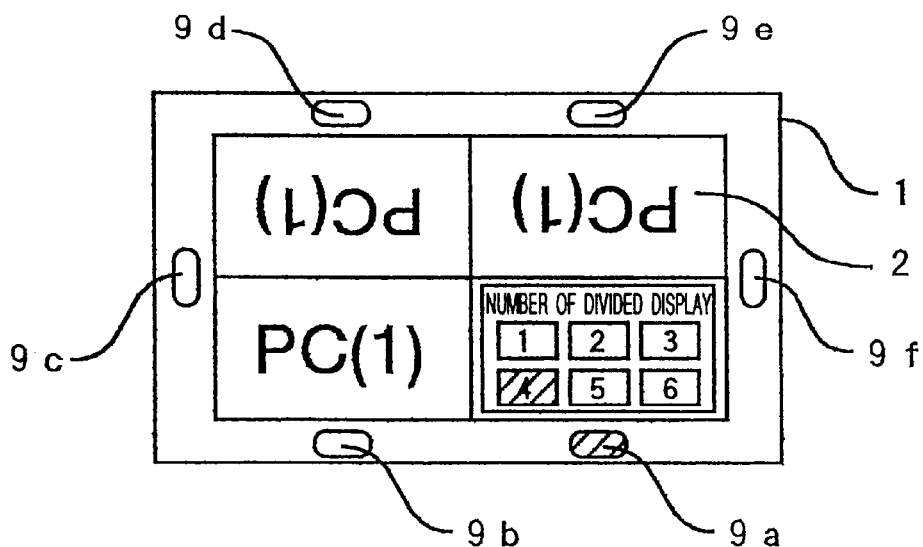
FIG. 13 shows the status displayed when number of split screens in FIG. 10 is displayed.
Figure 14:
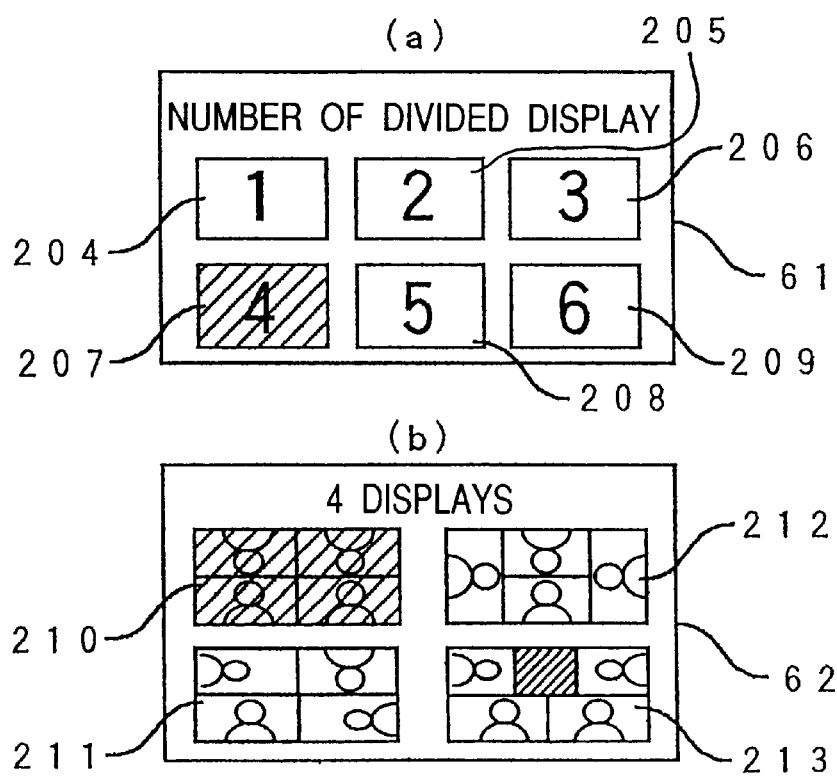
FIG. 14(a) shows the split screen menu shown in FIG. 10.
FIG. 14(b) shows the split screen layout of FIG. 10.
Figure 15:
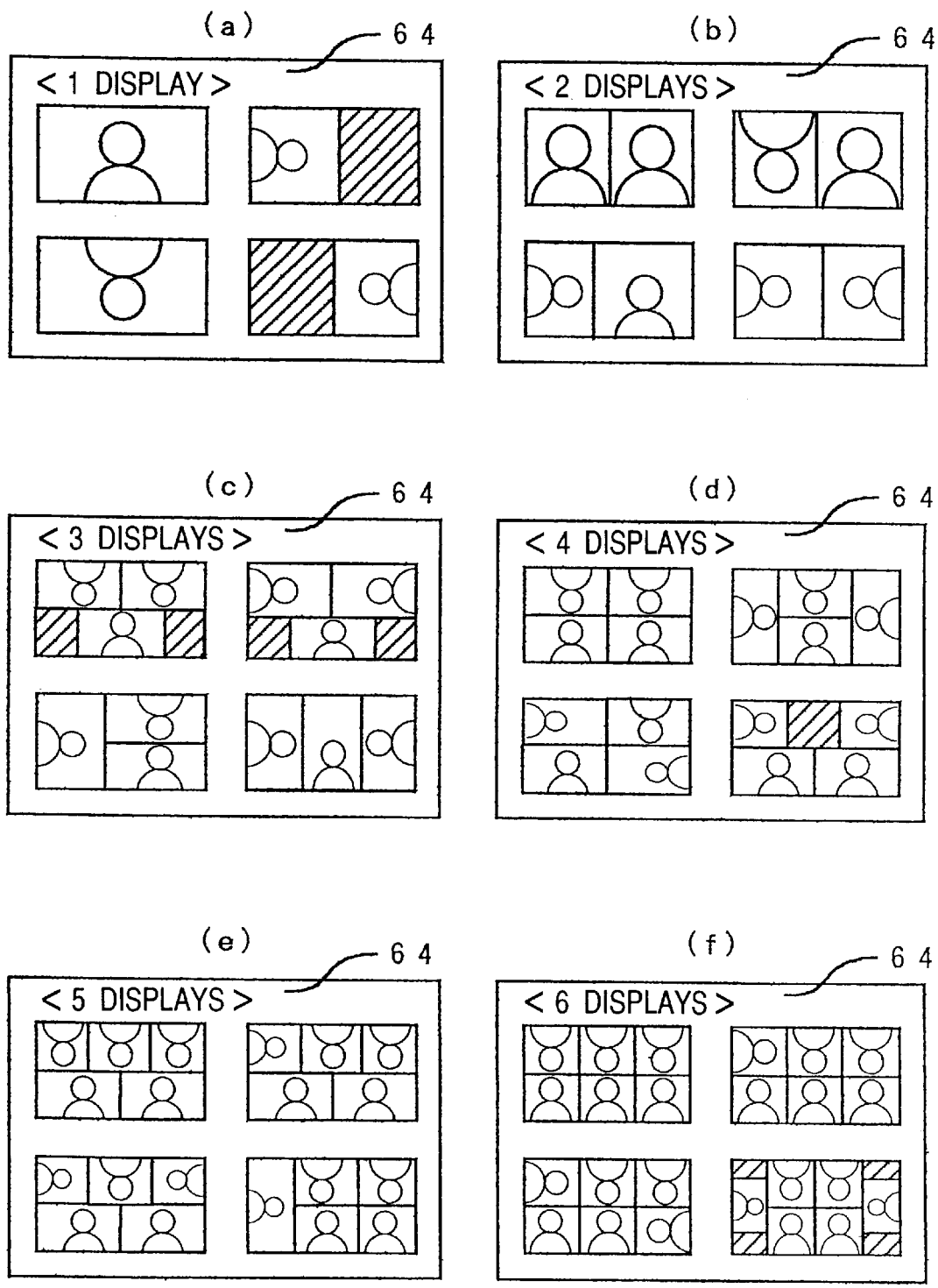
FIG. 15 shows the number of split screens and the screen layout.

FIG. 12 shows the display screen status when the split screen menu was selected in FIG. 10. FIG. 13 shows the status displayed when number of split screens in FIG. 10 is displayed. FIG. 14(*a*) shows the split screen menu shown in FIG. 10. FIG. 14(*b*) shows the split screen layout of FIG. 10. FIG. 15 shows the number of split screens and the screen layout.

In FIG. 10 through FIG. 15 the power is first turned on by using the power switch 4 (step 120). As shown in FIG. 11, no image information is shown on the display screen 2 if the power switch of the display device is turned on. The users take seats as preferred, around the display screen 2, and use the operating sections 9a–9f installed nearest to the user from among the plurality of operating sections installed within the frame 8. When, for instance, the menu button installed in the operating section 9 is pressed (step 121), the menu select screen 60 is shown in a reduced form on the display screen 2 above the operating section 9a.

The menu selection screen 60, the number of split screens 61 and the split layout screen 62 related later on are touch buttons in a sheet configuration. Instructions can be input by touching the image display section shown on the menu selection screen 60 with a finger, etc.

Further, the contents of the menu are comprised of a screen split (division of display) 200, a (input) change 201 for changing the orientation of the display 201 and changing the input information and a detailed split (detailed division of display) 203.

On the menu select screen 60, when the split screen 200 is specified by the cursor movement button 29 and the menu set button 28 is pressed (step 124), the menu select screen 60 disappears and the number of split screens 61 is displayed in a reduced form. This number of split screens 61 is for setting how much image information will be shown on the display screen 2.

When the number of split screens 61 is displayed, the desired number of screens is specified at screen 204 through 206 with the cursor movement button on 209 (step 125) and when the menu set button 28 is pressed, the number of split screens 61 disappears and the split layout screen 62 is shown in a reduced form.

This split layout screen 62 sets in what orientation (direction) to display the respective image information.

When the split layout screen 62 appears, the cursor movement button 29 specified a split layout 210–213 (step 126) and when the menu set button 28 is pressed, the image information is displayed in the specified orientation (direction) on the split screen in the entire display range "a" of the display screen 2.

The image information shown at this time is displayed with priority assigned to input (1) of the image input terminal 36. Also, the operation up until now was possible by using an operating section 9a through 9f, however in this case, the operating section from among 9a through 9f that was first specified has priority and the other operating sections from among 9a through 9f are disabled.

On the menu select screen 60, after the screen split has been set, the (input) change 201, the change of picture direction 202 and the detailed division of display 203 can be operated with any operating section 9a–9f and operated simultaneously.

The explanation for this embodiment described a 4 segment split for the screen split and the split screen layout however the split layout of the dual screen of FIG. 15(*b*), the split layout of the triple screen of FIG. 15(*c*), the split layout of the quadruple screen of FIG. 15(*d*), the split layout of the quintuple screen of FIG. 15(*e*), the split layout of the pentagonal screen of FIG. 15(*f*) can be presented on the split layout screens. The selection of the above mentioned screens from FIGS. 15(a) through 15(f) can be performed with steps 125 through 127.

Next, on the menu select screen 60, the method for making changes in the input information is described.

Figure 16:
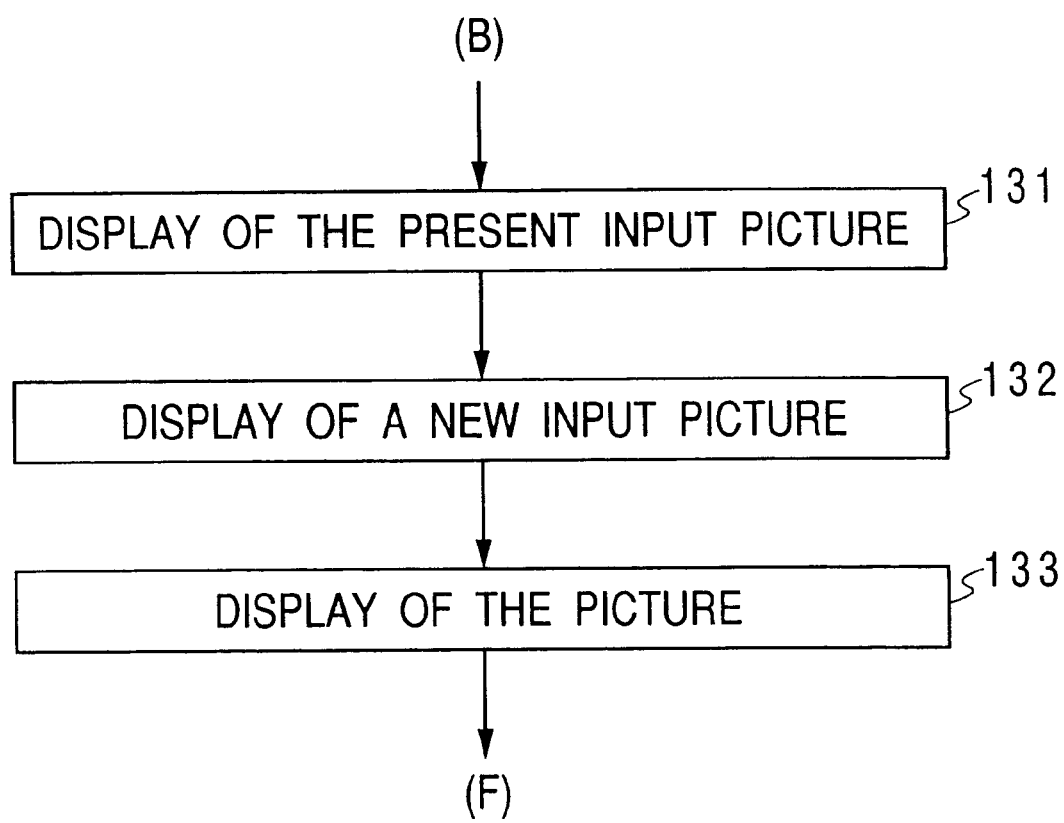
FIG. 16 is a flowchart showing the operation for changing the input image in the embodiment shown in FIG. 8.
Figure 17:
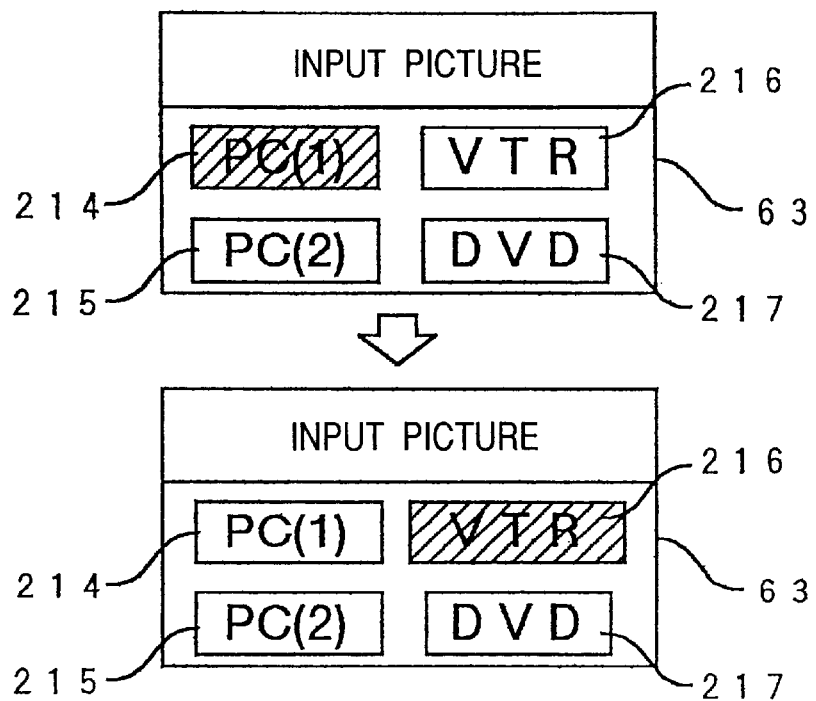
FIG. 17 is an example of the input selection screen of FIG. 16.
Figure 18:
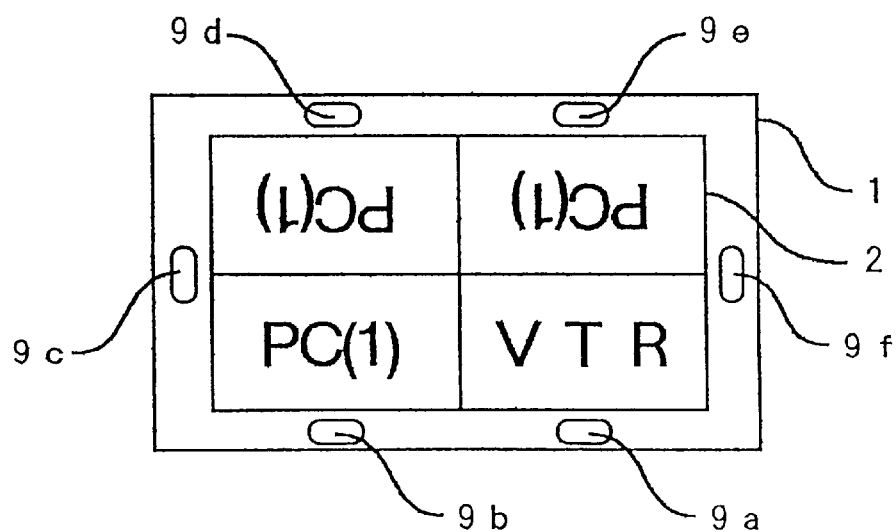
FIG. 18 is an example showing the status when the operation for changing the input image shown in FIG. 16 has been performed.

FIG. 16 is a flowchart showing the operation for changing the input image in the embodiment shown in FIG. 8. FIG. 17 is an example of the input selection screen of FIG. 16. FIG. 18 is an example showing the status when the operation for changing the input image shown in FIG. 16 has been performed.

In FIG. 16 through FIG. 18, the (input) change 201 is specified on the menu select screen 60 with the cursor movement key 29 and when the menu set button 28 is pressed (step 131), the menu select screen 60 disappears and the input information is displayed on the select screen 63 (step 132).

At this time, the input image information currently being displayed is usually displayed on the screen as image information input from the input (1) of the image input terminal 36 unless a change in input image information was specified after the power supply 4 was turned on. The type names 214–271 of input image information are displayed on the select screen 63. The portion having the type names of the image information currently being displayed is shown with oblique lines, inverted information or by flashing in order to make that portion clearly distinguishable.

The four types of input image information in FIG. 17, were described as PC(1) 214, PC(2) (215) and VTR216 and DVD217 however this invention is not limited to this arrangement and other image information may be used.

Here, when the input image information is displayed on the select menu 63, the type names 214 through 217 of the input image information displayed on the display screen 2 are specified with the cursor movement buttons 29 (step 133). The select menu 63 with the input information then disappears and the specified image information is displayed (step 134).

In the operation of steps 131–134, the plurality of operating sections 9 can be used simultaneously and the other image information screens are thus not subject to restrictions. The other image information not being operated is input information displayed after input from input (1) of video input terminal 36.

Next, in the menu select screen 60, the method for performing the change of picture direction 202 is described. This change in picture direction (orientation) is for changing the orientation of one's own display of image information.

Figure 19:
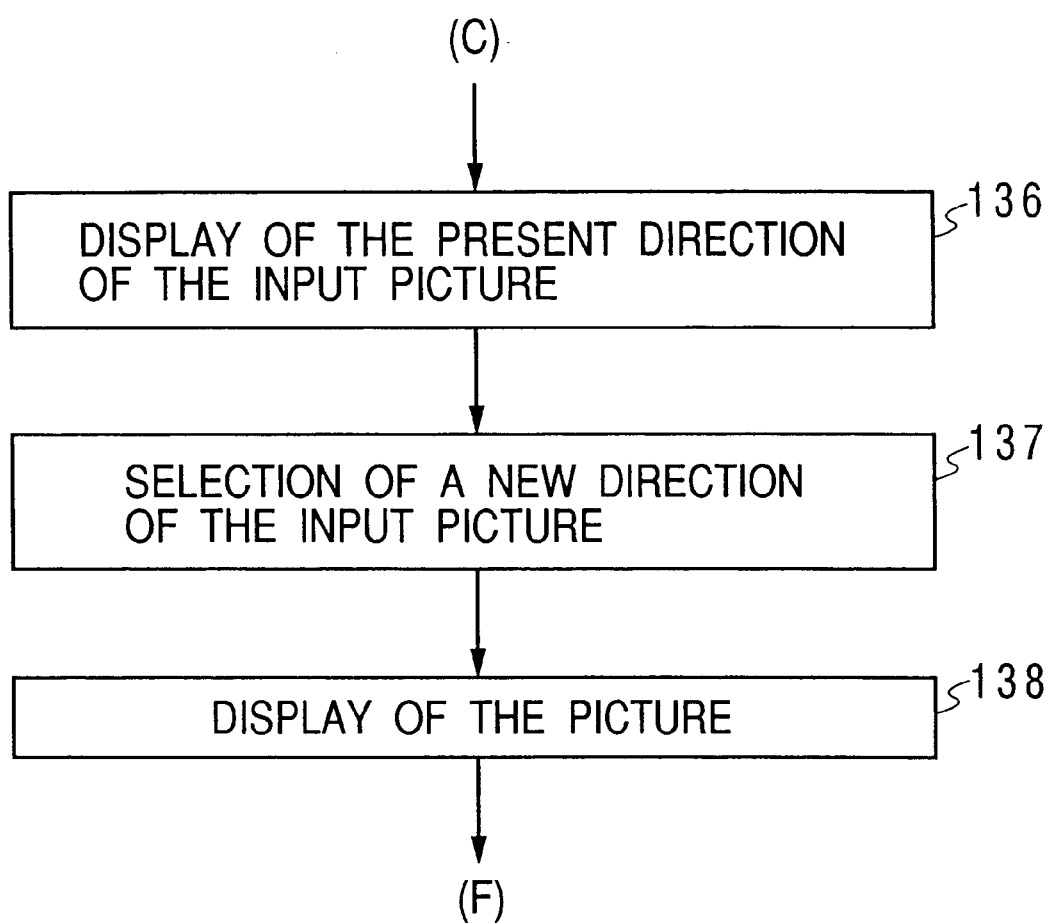
FIG. 19 is a flowchart showing the operation for changing the orientation of the display of the embodiment of FIG. 8.

FIG. 19 is a flowchart showing the operation for changing the orientation of the display of the embodiment of FIG. 8. Also, FIG. 20 is a drawing showing the change in picture direction screen.

Figure 21:
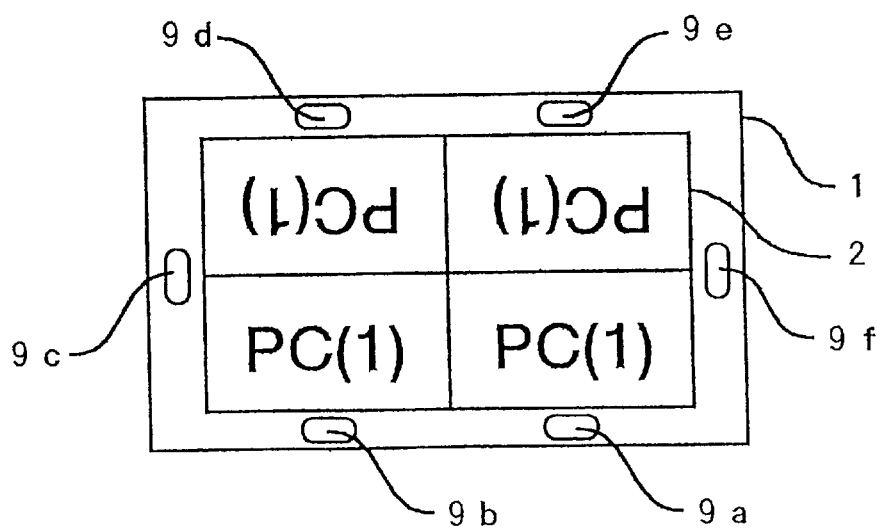
FIG. 21 is a drawing showing the status when the operation for the change in picture direction screen of the display of FIG. 19 was performed.

FIG. 21 is a drawing showing the status when the operation for the change in picture direction screen of the display of FIG. 19 was performed.

Figure 20:
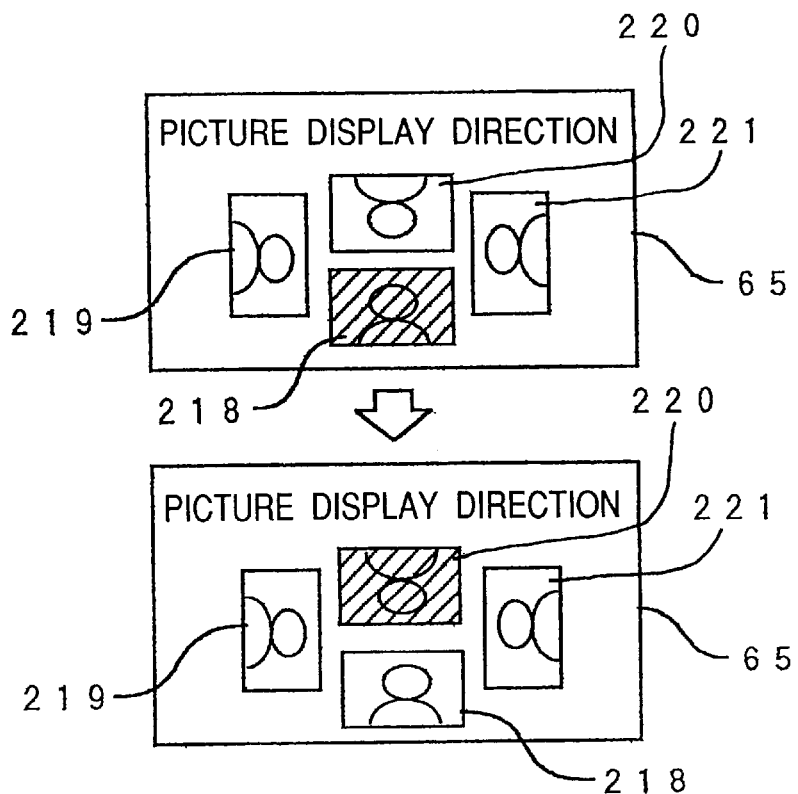
FIG. 20 is a drawing showing the change in picture direction screen.

In FIG. 19 through FIG. 21, the change of picture direction 202 is specified with the cursor change button 29 on the menu select screen 60 and when the menu set button 28 is pressed, (step 135), the menu select screen 60 disappears and the picture change select screen 65 is displayed (step 136).

At this time, the change of picture direction currently being displayed is already shown with the previously set screen split and split layout and the display is shown with oblique lines, as inverted information or is made to flash in order to clearly distinguish the current picture change direction.

Here, when the picture change select screen 65 is displayed, the desired new direction for the image information direction screen 218 is selected from the screens 219–221, and when specified with the cursor movement button 29 (step 137), the current image information direction screen 218 is changed to the normal display, while the changed direction of 219–222 is shown with oblique lines, inverted information or a flashing screen. Check the image whose picture direction has been changed and press the menu set button 28 to make the picture change select screen 65 disappear and to display the specified image information (step 138).

The picture change select screen 65 is shown with screen split and layout being used so that steps 136 through 138 can be performed even with the screen split and layout described in FIG. 20.

Further, a plurality of operating sections 9 can be simultaneously used in the operation of steps 135–138 so that there are no restrictions placed on the other image information screens.

This arrangement therefore allows other users to simultaneously utilize the display device so that one's own image information can easily be displayed normally or inverted thus allowing joint use of image (picture) information.

Next, the operation for performing the detailed split 203 (or detailed division of display) on the menu select screen 60 is described. This detailed split 203 is for the purpose of performing a detailed split of the display of the image information that one is using.

Figure 22:
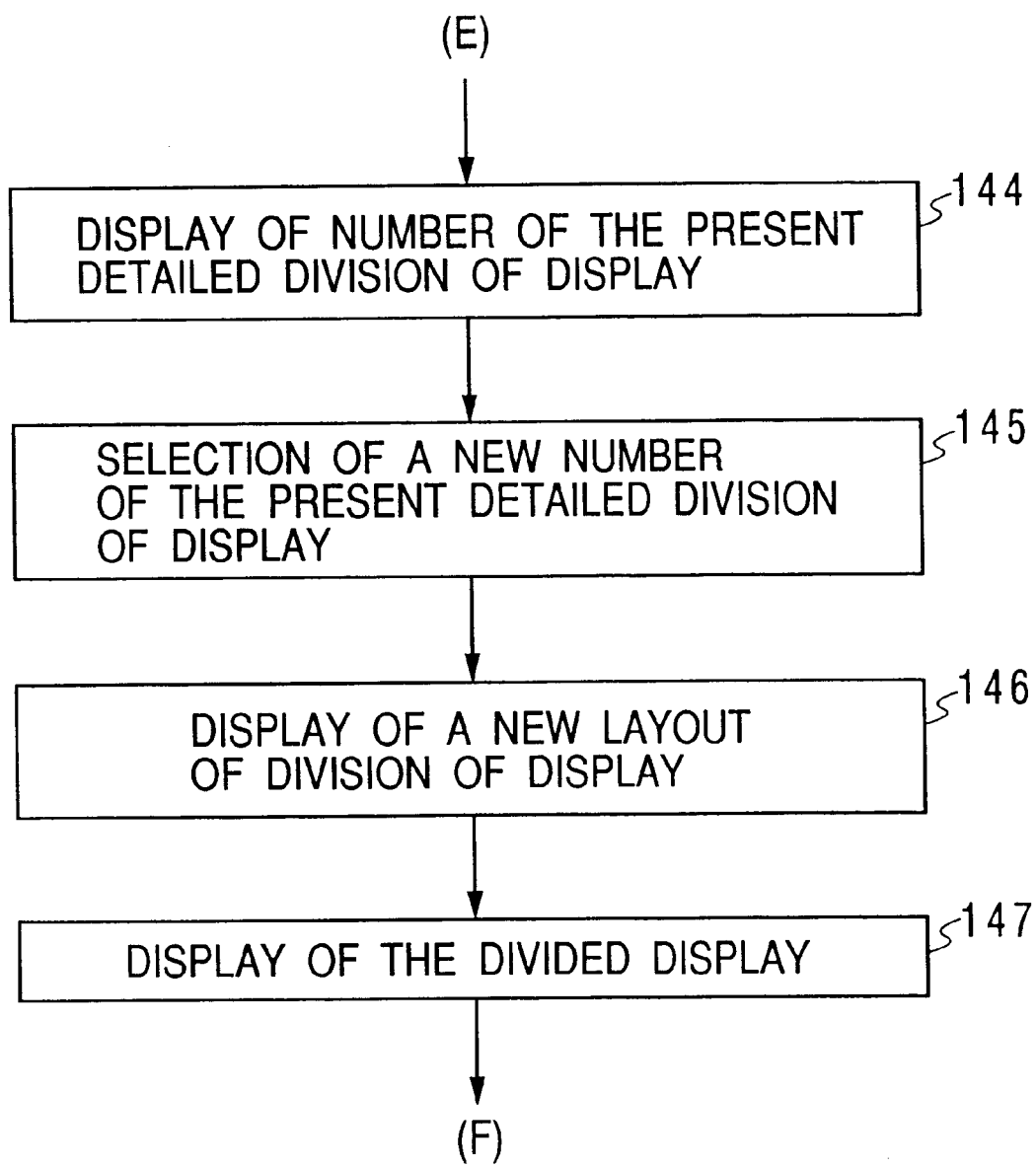
FIG. 22 is a flowchart showing the operation for a detailed split of the embodiment shown in FIG. 8.
Figure 23:
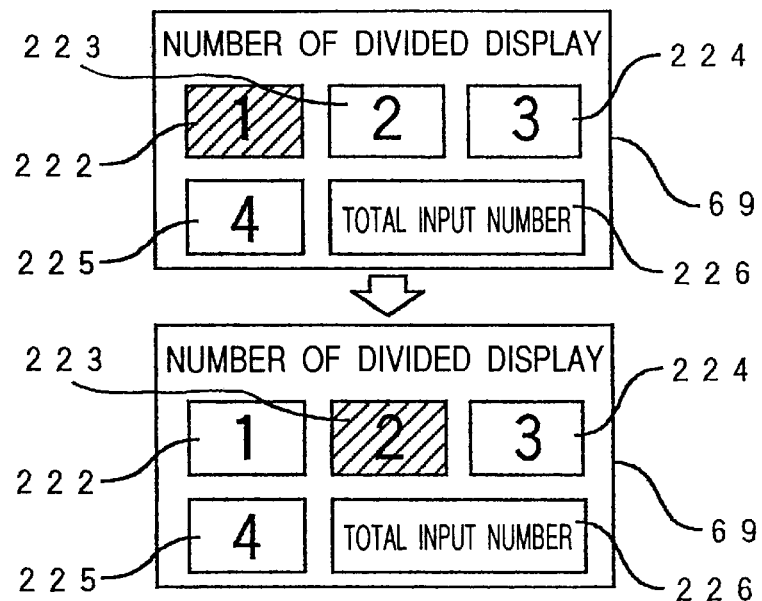
FIG. 23 is a drawing showing the detailed split select screen of FIG. 22.
Figure 24:
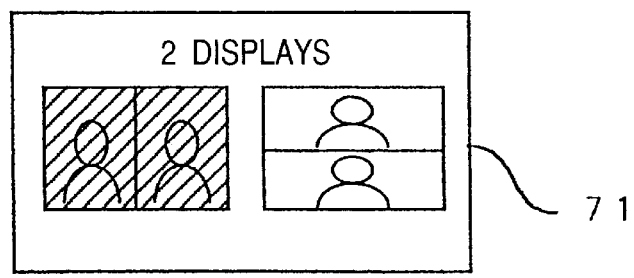
FIG. 24 is a drawing showing the split layout and the number of detailed split screens.
Figure 25:
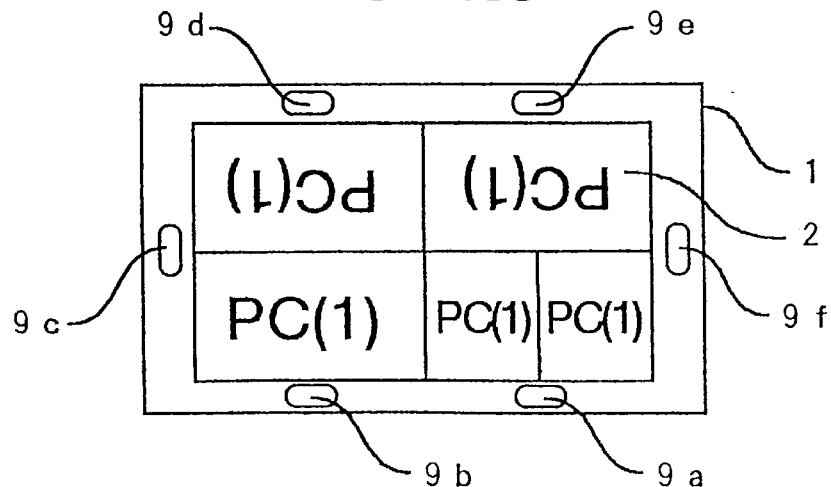
FIG. 25 is a drawing showing the status when the operation for detailed screen splitting of FIG. 22 was performed.

FIG. 22 is a flowchart showing the operation for a detailed split of the embodiment shown in FIG. 8. FIG. 23 is a drawing showing the detailed split select screen of FIG. 22. FIG. 24 is a drawing showing an example of the split layout and the number of detailed split screens. FIG. 25 is a drawing showing an example of the status when the operation for detailed screen split of FIG. 22 was performed.

In FIG. 22 through FIG. 24, the detailed split 203 is specified on the menu select screen 60 with the cursor movement button 29, and when the menu set button 28 is pressed (step 143), the menu select button disappears and the detailed split select screen 69 is displayed (step 144).

Here, one screen split is displayed from 222—all input count 226, however the current number of screen splits are shown with oblique lines, inverted information or a flashing screen in order to make them conspicuous.

Here, when the detailed split select screen 69 is displayed, the desired number of split screens is selected from 223–226 and specified with the menu set button 29, and when the menu set button 28 is pressed (step 145), a detailed layout screen 71 is displayed. When this detailed layout is selected with the cursor movement button 29 and the menu set button 28 is pressed (step 146), the detailed layout screen 71 disappears and the image information is displayed with the selected split layout (step 147).

In FIG. 24, the detailed layout screen was described as being split into two screens in the left and right as well as the up and down directions though not shown in the drawing, in the one split screen 222—all input count 226, a detailed split layout screen shown in opposing directions of left/right or up/down, on whatever split screen by using the operating sections 9a–9f.

In the operation of steps 144–147, the plurality of operating sections 9 can be used simultaneously and the other image information screens are thus not subjected to restrictions.

Operation of the above steps 131–134 as well as the above steps 135–138 is possible on the detailed split screen. Next, the change of input information and change of picture direction on the detailed split screen is described.

Figure 26:
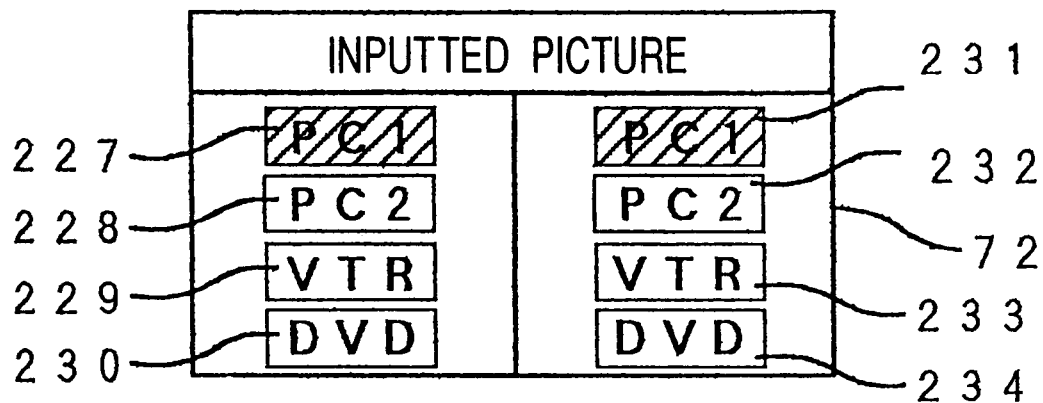
FIG. 26 is the input image at detailed split screen for the change select screen of FIG. 25.
Figure 27:
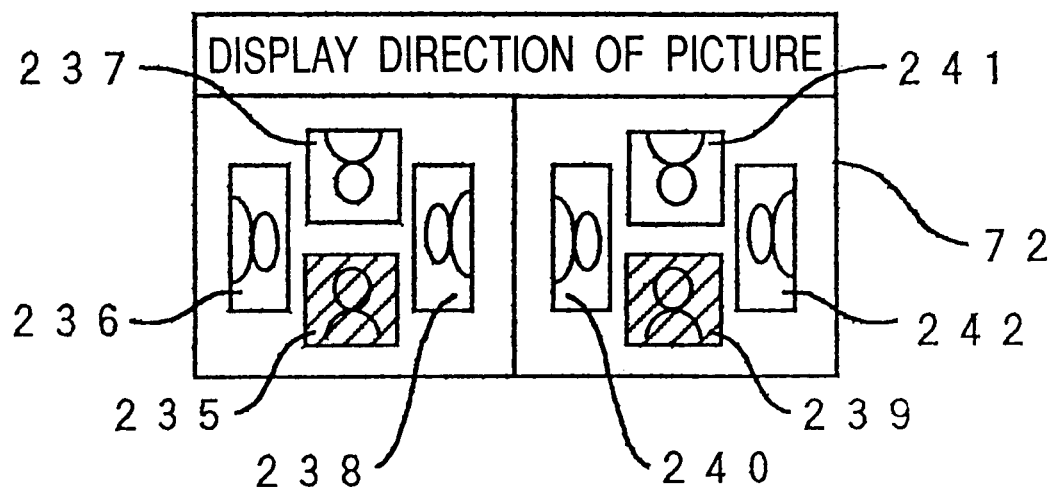
FIG. 27 is the image display change select screen of the detailed split image screen.

FIG. 26 is the change select screen for input images on the detailed split screen. FIG. 27 is the image display change select screen of the detailed split screen.

In FIG. 26, after setting the detailed split of the image information, in the above steps 131–134, an operation is added for setting what input information to display on what screen of the detailed split screen in the above step 133 so that a single input image or a plurality of input images can be displayed on the detailed split screen. The selection and setting of the input information is performed with the cursor movement button 29 and the menu set button 28.

In FIG. 27, in the operation of steps 135–138 for changing the picture direction, an operation is added in the above step 137 for setting in what direction to display the respective detailed split screens so that a suitable direction can be displayed for each detailed split screen to be used.

This arrangement allows easily displaying the necessary image information on a user's detailed split image information without interfering with other user's simultaneously using the same display device so that so that image information for a plurality of users can easily be displayed normally or inverted thus allowing joint use of image (picture) information.

Further, in meetings and conferences held with the participation of a plurality of people, information based on items such as paper documents can be provided close at hand to participants so that along with reassuring the user, the meeting or conference can proceed smoothly because unlike a conventional medium such as paper, there is no possibility of the order becoming mixed up during use or of similar problems occurring.

A personal computer may be utilized by connection to the input terminal 36 and information displayed on the image information screen then added, revised or deleted.

After the task of displaying the image information screen, a personal computer connected to a printer or another computer can receive an input by means of an output terminal not shown in the drawing so that image information can be extracted or recorded as needed.

Next, the third embodiment of this invention will be explained while referring to the accompanying drawings. Detailed explanations involving parts identical to those in the first embodiment of this invention having the same names and same symbols are omitted.

Figure 28:
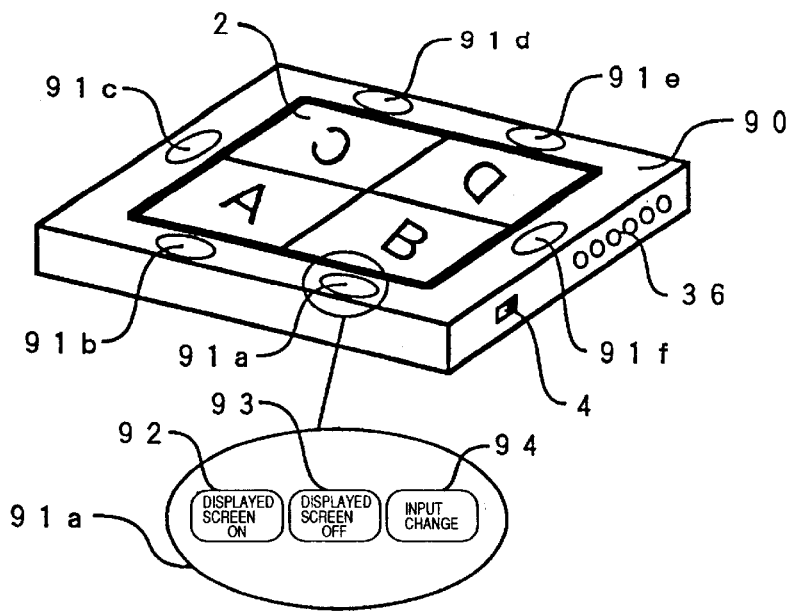
FIG. 28 is an oblique view of the display device of the third embodiment of this invention.

FIG. 28 is an oblique view of the display device of the third embodiment of this invention. Also, FIG. 29 is a block diagram showing the display device of the third embodiment of this invention.

Figure 29:
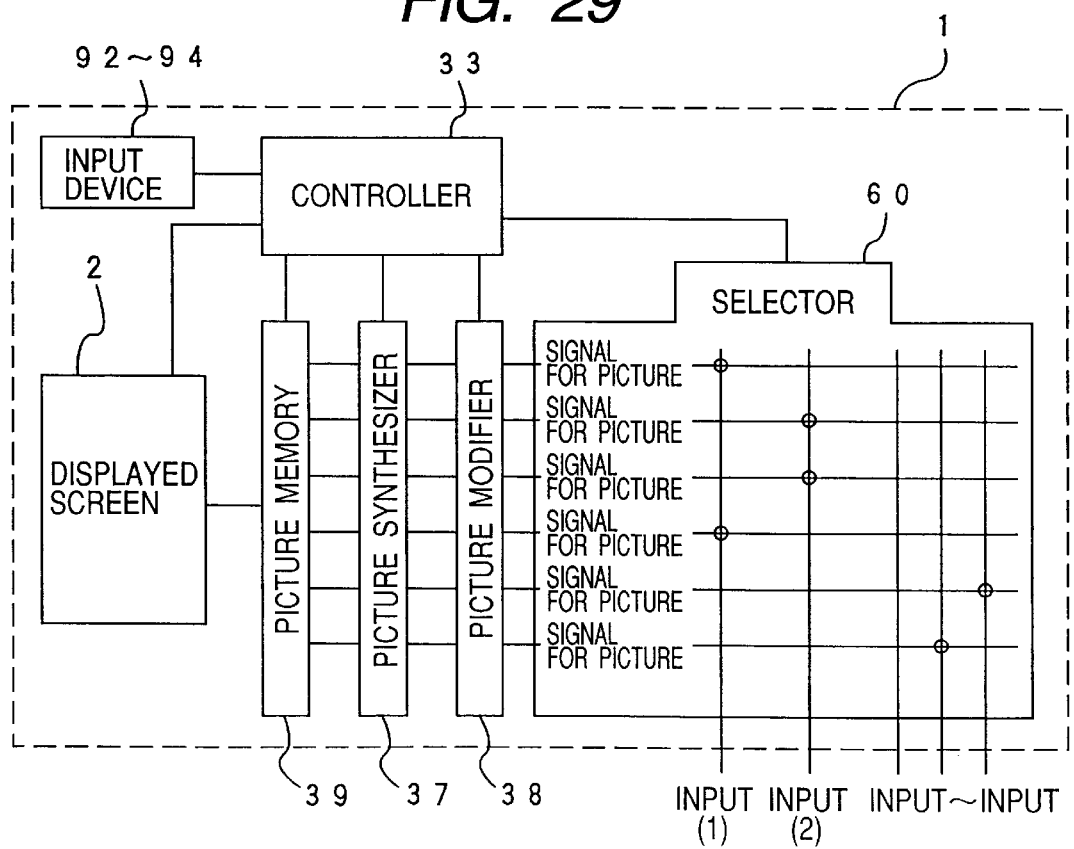
FIG. 29 is a block diagram showing the display device of the third embodiment of this invention.

In FIG. 28 and FIG. 29, the panel 90 of the third embodiment of this invention has an aperture on the top to expose the display screen 2.

A power switch 4 and an image information input terminal 32 are installed on the side of the panel 90. An operating sections 91a through 91f are installed as input devices in a frame 8 of the panel 90. These operating sections 91a through 91f are respectively comprised of an ON button 92, an image information OFF button 93 and an input picture change button 94. The ON button 92, the image information OFF button 93 and the input picture change button 94 are comprised of touch buttons having a sheet configuration.

Besides the operating sections 91a through 91f and the display device 2, the panel 90 also contains; a controller 33 to control operation based on input from the operating sections 91a through 91f, a select function 60 to select image information input from the input terminals 36, a picture modifier (image information processor) 38 to convert the video signals and PC signal (RGB signals) input from buttons 25 into a standard format and further into an image of a specified size, position and angle, a picture synthesizer 37 to synthesize a plurality of image information into one piece of image information, an image memory 39 to store the modified and synthesized image information, and a power unit not shown in the drawing.

As is related later on, this embodiment is capable of displaying a plurality of image information on the display screen 2. Each image information input for display is selected and processed for the specified size and orientation (direction) in the picture modifier (image information processor) 38 and the picture synthesizer 37 and after being temporarily stored by way of the controller 33 in the image memory 39, is displayed on the display screen 2.

A brief description of the above embodiment has now been related. Next, a detailed description of the operation of this embodiment will be explained.

Figure 30:
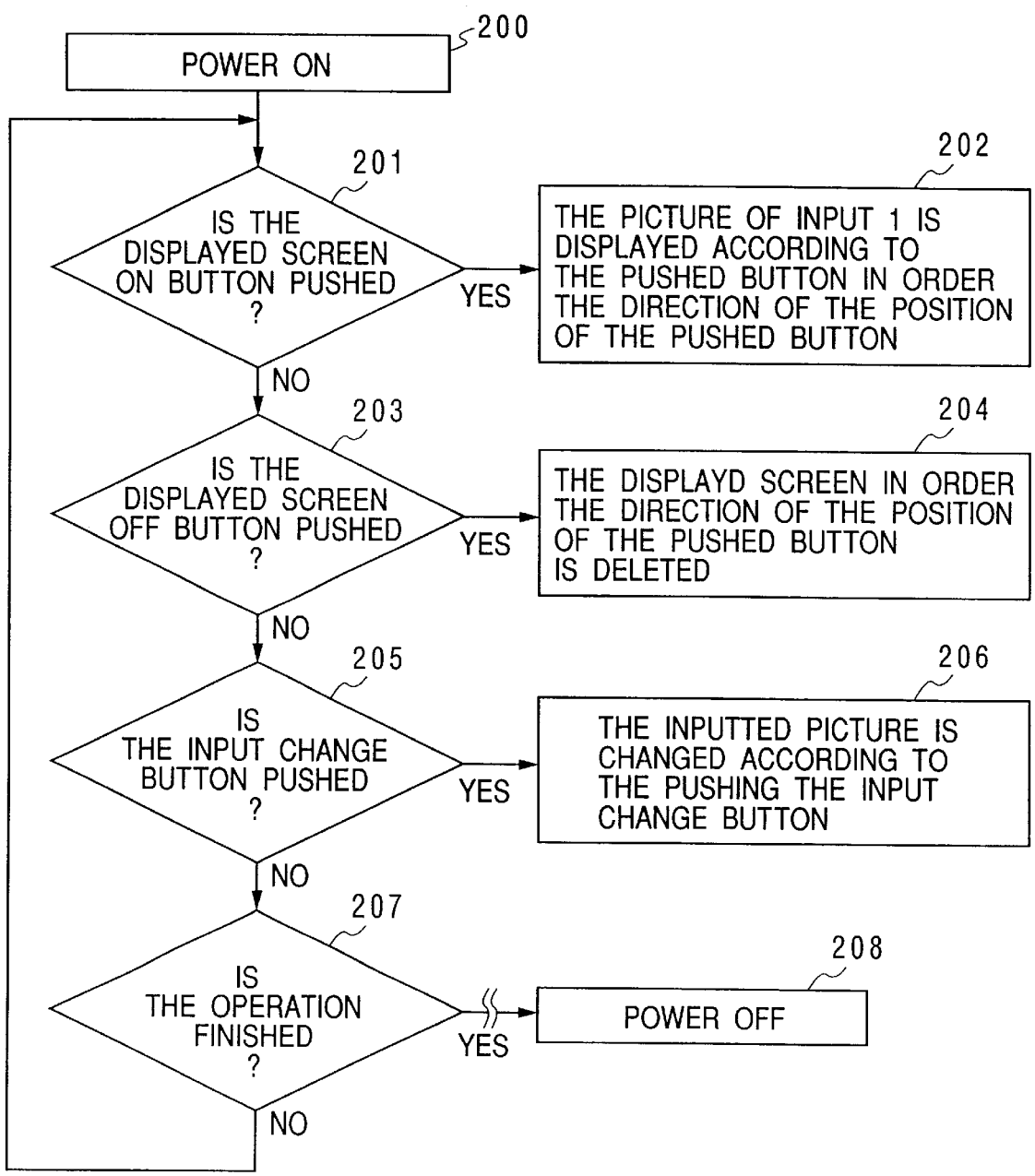
FIG. 30 is a flowchart showing the operation of the embodiment of FIG. 28.
Figure 31:
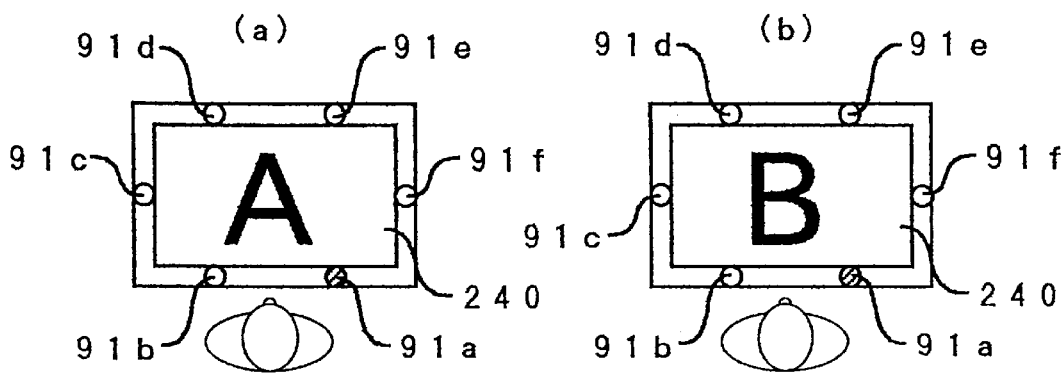
FIG. 31 is a drawing showing the status when operated by one person.
Figure 32:
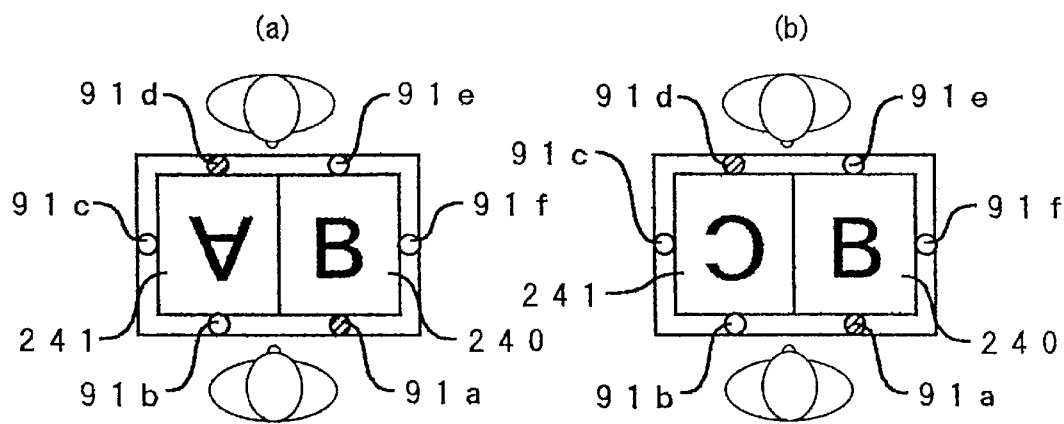
FIG. 32 is a drawing showing the status when operated by two persons.

FIG. 30 is a flowchart showing the operation of the embodiment of FIG. 28. Also, FIG. 31 is a drawing showing the status when operated by one person. FIG. 32 is a drawing showing the status when operated by two persons. FIG. 33 is a drawing showing the status when operated by three persons as well a four persons.

Figure 34:
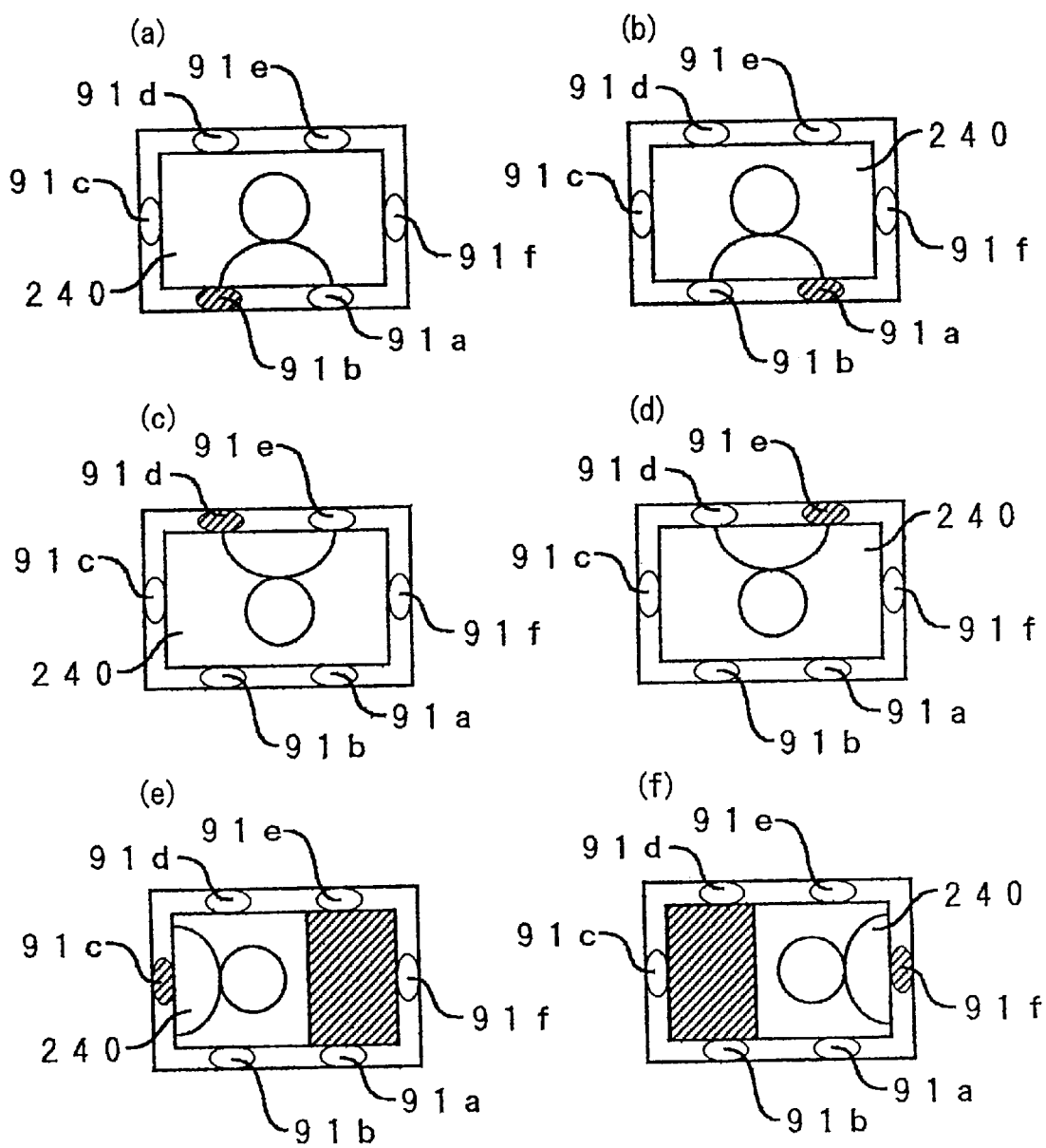
FIG. 34 is a drawing showing the picture direction change and the screen split when operated by one person.
Figure 35:
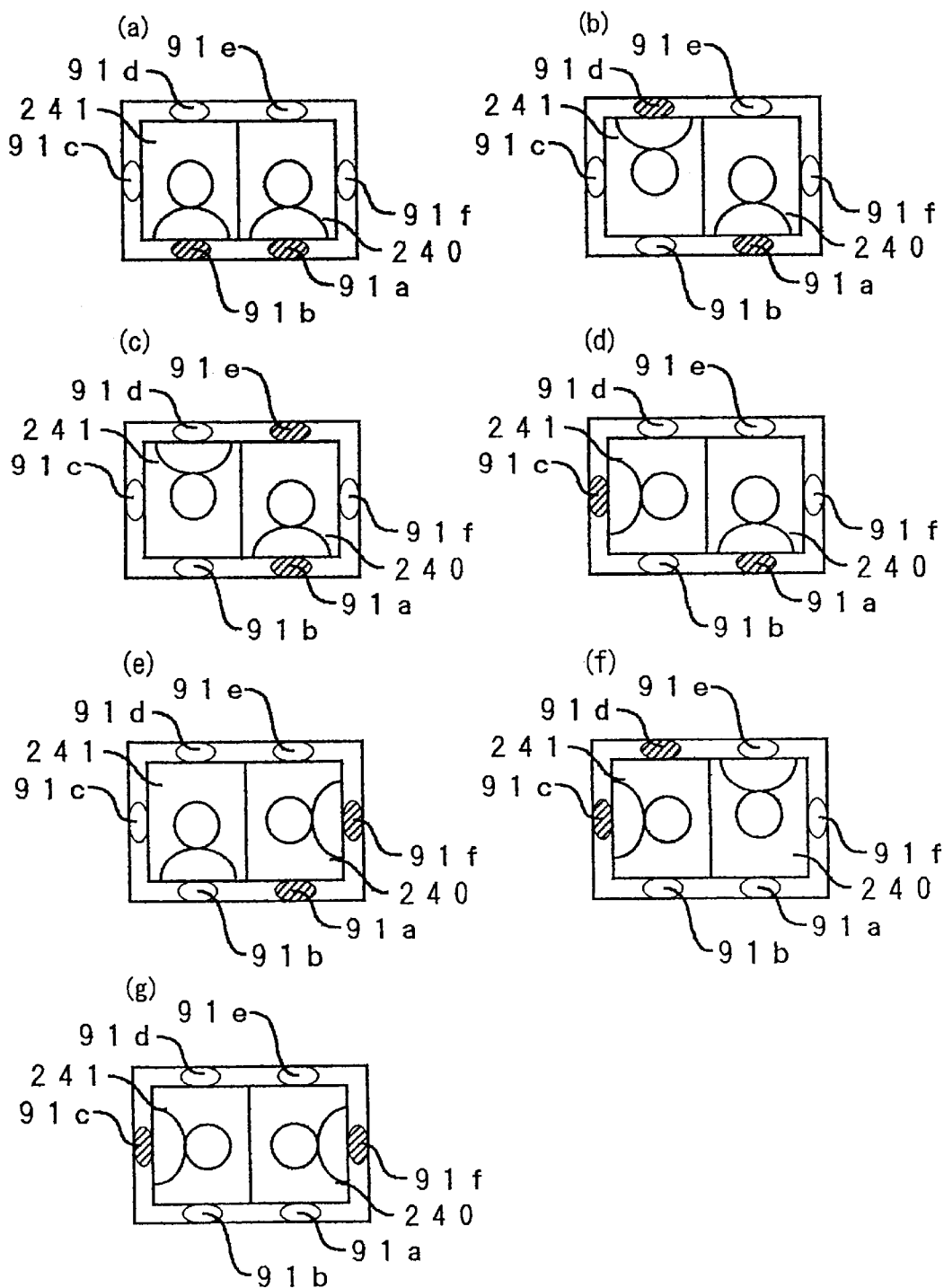
FIG. 35 is a drawing showing the picture direction change and the screen split when operated by two persons.
Figure 36:
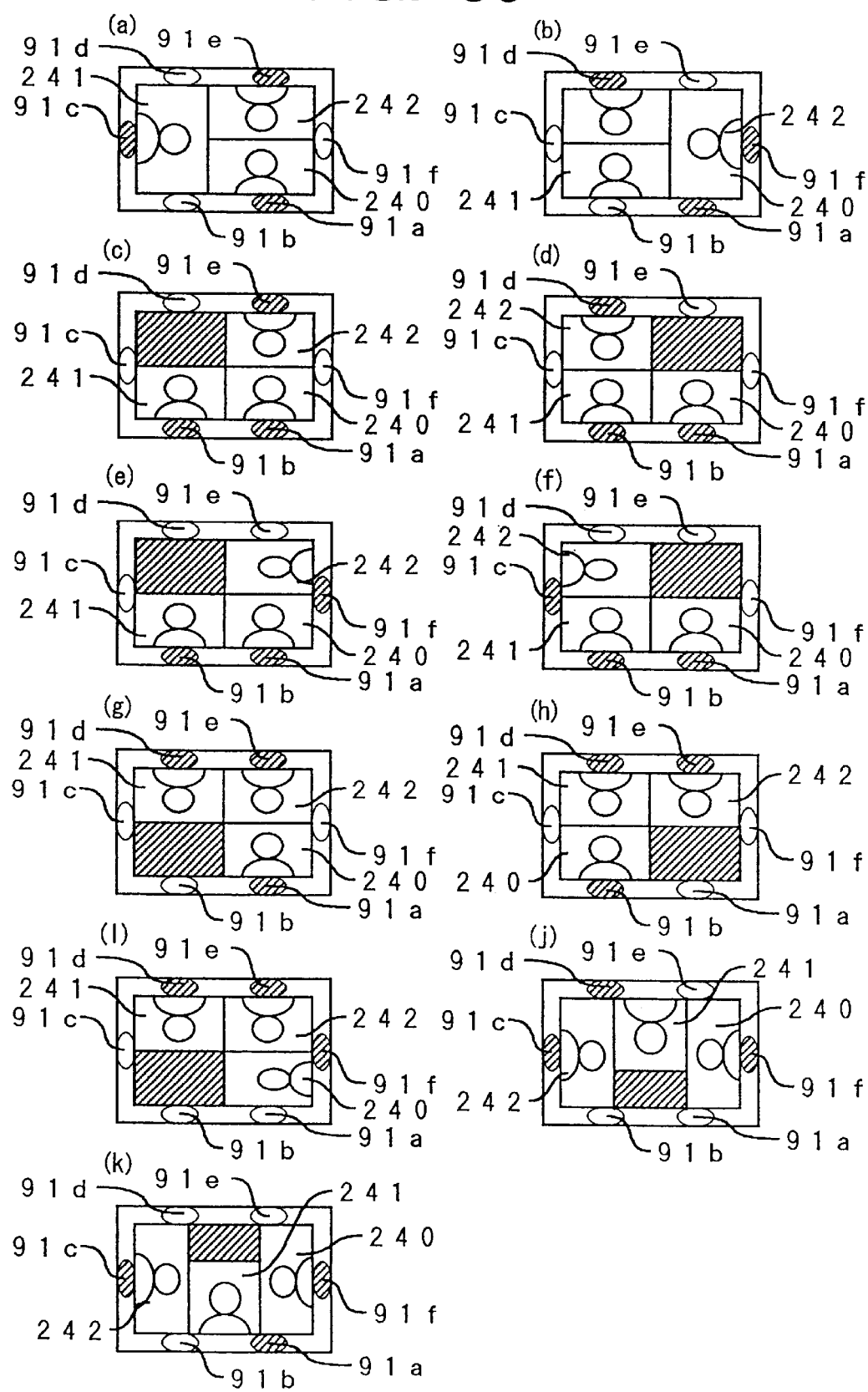
FIG. 36 is a drawing showing the picture direction change and the screen split when operated by three persons.
Figure 37:
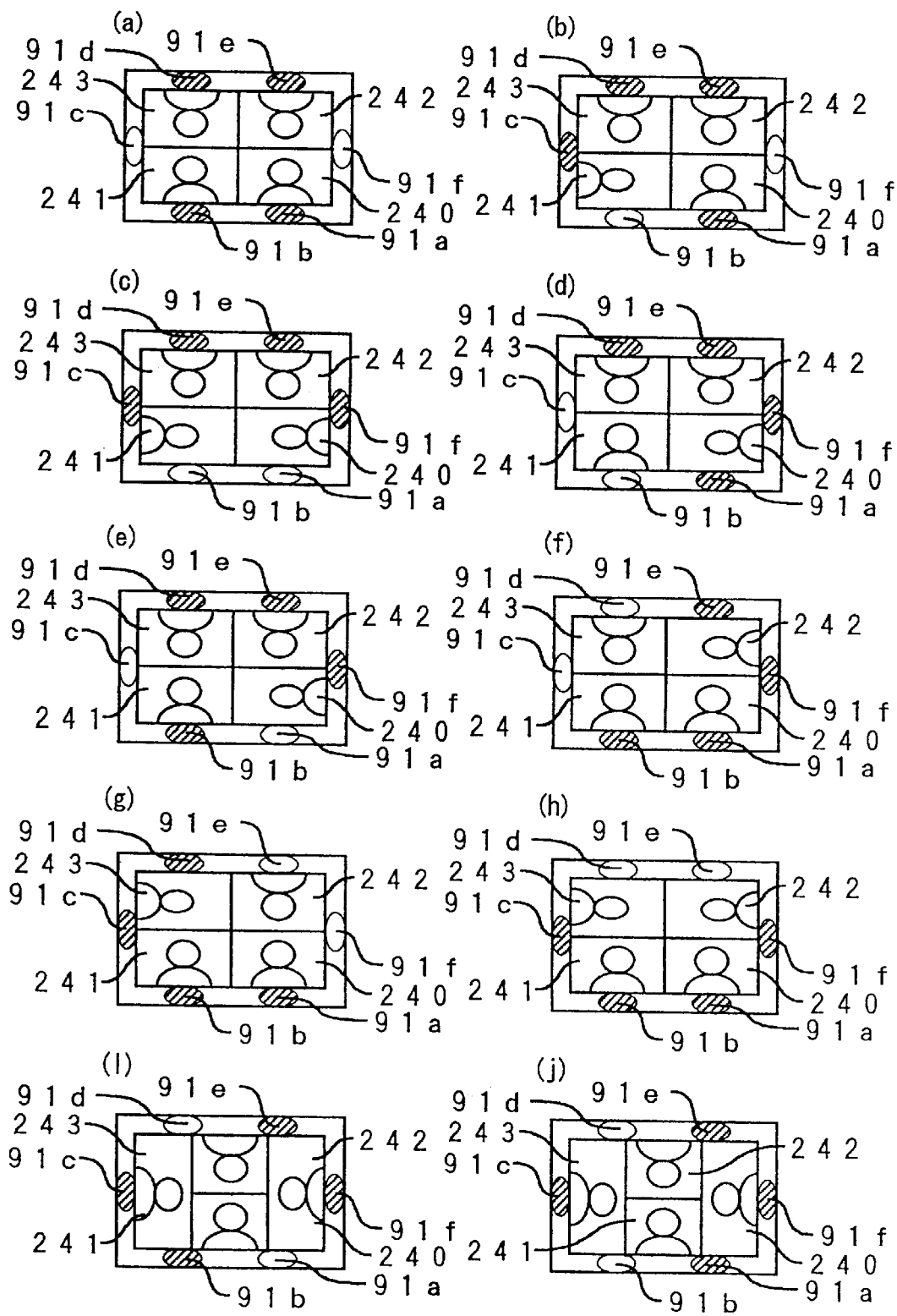
FIG. 37 is a drawing showing the picture direction change and the screen split when operated by four persons.
Figure 38:
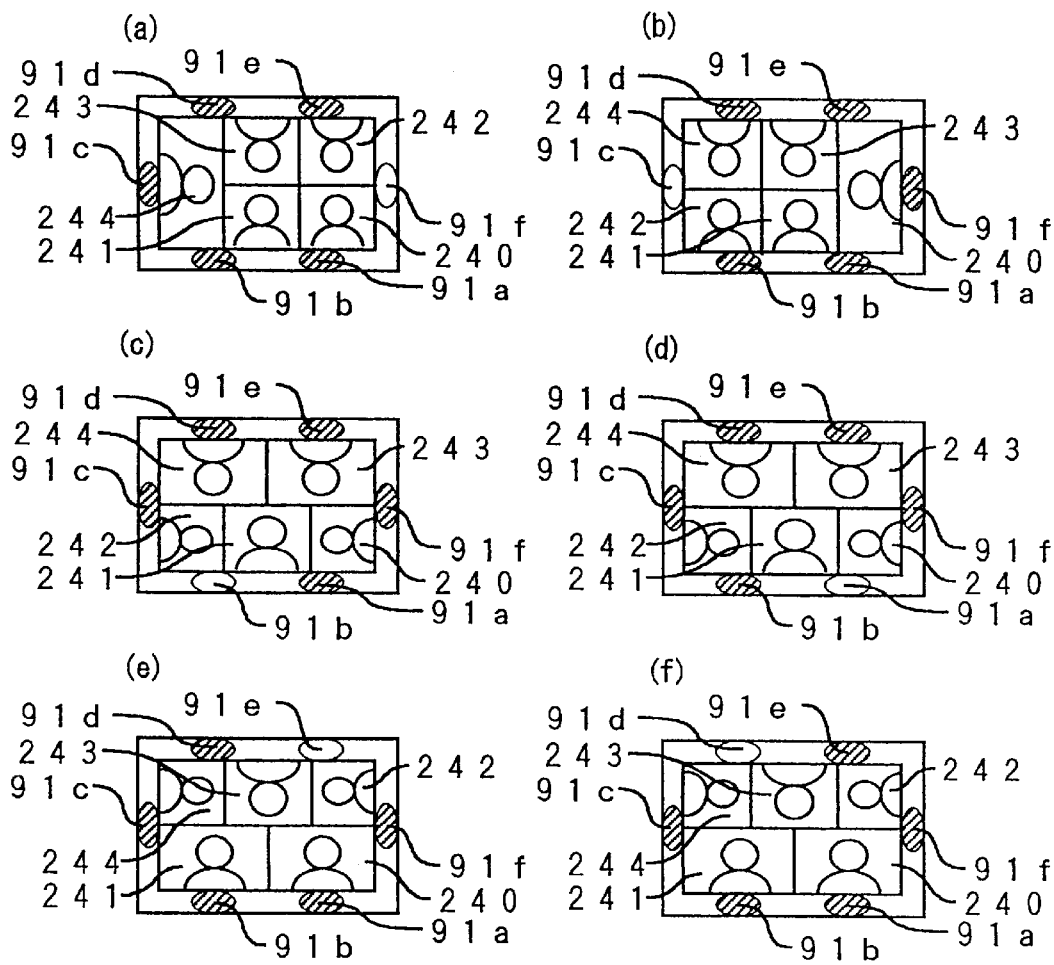
FIG. 38 is a drawing showing the picture direction change and the screen split when operated by five persons.
Figure 39:
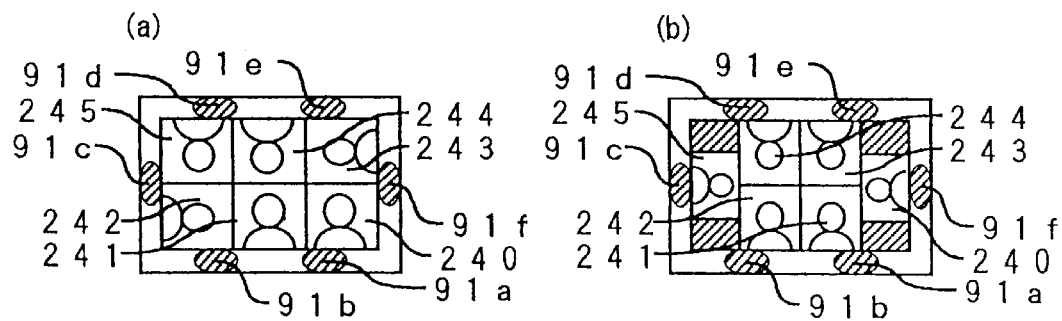
FIG. 39 is a drawing showing the picture direction change and the screen split when operated by six persons.

FIG. 34 is a drawing showing the picture direction change and the screen split when operated by one person. FIG. 35 is a drawing showing the picture direction change and the screen split when operated by two persons. FIG. 36 is a drawing showing the picture direction change and the screen split when operated by three persons. FIG. 37 is a drawing showing the picture direction change and the screen split when operated by four persons. FIG. 38 is a drawing showing the picture direction change and the screen split when operated by five persons. FIG. 39 is a drawing showing the picture direction change and the screen split when operated by six persons.

In FIG. 30 through FIG. 39, the power switch 4 is pressed and the power to the panel 90 then turns on (step 200). The user presses the image information ON button 92 (step 201) on the operating section 91a–91f positioned nearest to the user's position, and the image information from the input (1) in an upright or inverted position versus the image information ON button that was pressed is automatically displayed (step 202).

When the operating section 91a as shown in FIG. 31(a) is pressed, the image information is displayed normally facing the operating section 91a but if operating section 91b is used instead of operating section 91a, the display will still be shown (right side up) in the same way. Also, though not shown in the drawing, when operating section 91d or 91e is operated, the image information will be displayed (right side up) to face the operating sections 91d and 91e.

When finished with the display screen currently being shown, the image information OFF button 93 is pressed (step 203), and the image information displayed at the position matching (facing) the image information OFF button that was pressed, disappears (step 204).

The panel 90 is provided with an output terminal not shown in the drawing and the instructions in this step 204 displayed on the image information screen may be recorded on a printer or personal computer by means of this output terminal.

When a change in the input image (picture) is required while the image information is displayed, pressing the input picture change button 94 (step 205) will switch the image information (step 206). Pressing this input picture change button 94, as shown in FIG. 31(b) switches in order from inputs (1) through (6).

Next, a description using an actual example describes use of this invention simultaneously by a plurality of users.

The example in FIG. 32 shows two people simultaneously using the invention however an information screen 240 is displayed to face the operating section 91a and the user of operating section 91a. An information screen 240 is displayed to face the operating section 91d and the user of operating section 91d.

Further, switching the image information of the image information screen 241, can be performed with the above mentioned steps 205 through 206. In the operation for switching this image information can be simultaneously performed by operating sections 91a, 91b as well as operating section 91a.

In addition, the image information screen 241 is displayed even if the operating section 91b is used instead of the operating section 91a. Also, the image information screen 241 is displayed even if the operating section 91e is used instead of the operating section 91d.

FIG. 33 shows an example in which three users simultaneously operated the embodiment and an information screen 240 is displayed to face the operating section 91a and the user of operating section 91a. An information screen 240 is displayed to face the operating section 91d and the user of operating section 91d. An information screen 240 is displayed to face the operating section 91c and the user of operating section 91c.

Here, when the number of users increases by one, an information screen 243 is displayed to face the operating section 91b in which case the image information is shown in a reduced form on the image information screen 242.

Here also, when the user operating the operating section 91c has pressed the image information OFF button 93 to finish operating, the image information screen 242 disappears and the image information screen 241 then appears at that location, and image information is not shown at the location where the image information screen 241 was displayed when used by four people. As shown in FIG. 33(d), an operating section 91e or an operating section 91f not shown in the drawing is provided.

Next, the splitting of the image information and the layout when the operating section 91 is used are described.

FIG. 34 shows an example with one user in which image information is displayed to face the operating sections 91a, 91b and the user of operating section 91a, 91b. Image information is displayed to face the operating sections 91d, 91e and the user of operating sections 91d, 91e. Image information facing the user using operating section 91c on the left side of the display screen 2 is provided. Image information facing the user using the operating section 91f on the right side of the display screen 2 is provided.

FIGS. 35(a) through 35(g) show simultaneous operation by two users but when these two users operate different operating sections 91, the display screen 2 is split into two screens and displays two pieces of image information. In other words, when using a plurality of operating sections, the number of image information that is displayed matches the number operating sections being used.

When two users operated the operating section 91a and the operating section 91b, image information is displayed that correctly faces these operating sections 91a, 91b. Though not shown in the drawing, when operating sections 91d and 91e are utilized, image information is displayed to respectively face these operating sections 91d and 91e.

An image information screen 240 is displayed to face the operating section 91a when another user operates the operating section 91a. An image information screen 241 is displayed to face the operating section 91d when another user operates the operating section 91d.

Further, when the operating section 91b is operated instead of operating section 91a, an image information screen 240 is displayed that faces the operating section 91a. When an operating section 91e is operated instead of the operating section 91d, an image information screen 240 is displayed that faces the operating section 91d.

The image screen 240 is also displayed facing the operating section 91a as shown, when another user has operated the operating section 91a. When another user has operated the operating section 91c, an image information screen 241 is displayed facing 91c as shown but when another user has operated the operating section 91f, an image information screen 241 facing the operating section 91a is displayed, and the image information screen 240 faces the operating section 91c.

When another user has operated the operating section 91c, an image information screen 241 is displayed facing 91c as shown. When another user has operated the operating section 91f, an image information screen 240 is displayed facing 91f as shown.

FIGS. 36(a) through (n) shows examples of simultaneous use by three users.

When three users operate the operating section 91a, the operating section 91c and the operating section 91e, the image information screen 240 is displayed to face the operating section 91a, the image information screen 241 is displayed to face the operating section 91c, and the image information screen 242 is displayed to face the operating section 91e.

When the operating section 91a, the operating section 91b and the operating section 91e have been operated, the display screen 2 is split into four screen segments and no image information is displayed on the image information screen 243. In this operation, when the operating section 91d is operated instead of operating section 91e, then no image information is displayed on the image information screen 242.

When the operating section 91a, the operating section 91b and the operating section 91f have been operated, the display screen 2 is split into four screen segments and no image information is displayed on the image information screen 243. Here, when the operating section 91c is operated instead of operating section 91f, then no image information is displayed on the image information screen 242.

When the operating section 91a, the operating section 91d and the operating section 91e have been operated, the display screen 2 is split into four screen segments and no image information is displayed on the image information screen 241. Here, when the operating section 91b is operated instead of operating section 91a, then no image information is displayed on the image information screen 240.

Further, when the operating section 91c, and the operating section 91f are operated, a wide screen which is vertically long as seen from the operating section 91a, is displayed.

Examples of simultaneous use by four users are shown in FIG. 37(a) through FIG. 37(f).

When the operating section 91*a*, the operating section 91*b*, operating section 91*d* and the operating section 91*e* have been operated by four people, an image information screen 240 is displayed facing the operating section 91*a*, an image information screen 241 is displayed facing the operating section 91*b*, an image information screen 243 is displayed facing the operating section 91*d*, and an image information screen 242 is displayed facing the operating section 91*e*.

Thus, when four people operate the operating sections 91*a* through 91*f*, the image information displays are split into the applicable screen segments facing the applicable operating sections. When the operating section 91*c* and operating sections 91*f* are operated, the image information screen 241 and the image information screen 242 are displayed as a wide screen, and the image information screen 240 and the image information screen 243 are displayed as screens occupying nearly the same space vertically and horizontally.

FIGS. 38(*a*) through 38(*f*) show examples of simultaneous use by five users.

When the operating section 91*a*, the operating section 91*b*, the operating section 91*c*, operating section 91*d* and the operating section 91*e* are operated by five people, an image information screen 240 is displayed facing the operating section 91*a*, an image information screen 241 is displayed facing the operating section 91*b*, an image information screen 244 is displayed facing the operating section 91*c*, an image information screen 243 is displayed facing the operating section 91*d*, and an image information screen 242 is displayed facing the operating section 91*e*.

Thus, when the operating section 91*a*, the operating section 91*b*, the operating section 91*d*, and the operating section 91*e* and additionally the operating section 91*c* or the operating sections 91*f* are operated, the image information screen 244 or the image information screen 240 are displayed as wide screens.

Further, when the operating section 91*d*, the operating section 91*e*, the operating section 91*c*, and the operating section 91*f* and also the operating section 91*a* or the operating sections 91*f* are operated, the image information screen 240, image information screen 241, and image information screen 244 are displayed in roughly the same percentage in the horizontal and vertical directions.

Also, when the operating section 91*a*, the operating section 91*b*, the operating section 91*c*, and the operating section 91*f* and additionally the operating section 91*d* or the operating sections 91*e* are operated, the image information screen 244, image information screen 243, and the image information screen 242 are displayed in roughly the same percentage in the horizontal and vertical directions.

In the single display device of the embodiment as described above, the display size and the number of information screens can be easily changed to match the number of users so that the most ideal image information screen to match the number of users can be provided so that no one user monopolizes the entire single display device.

Further, the image information used by other users can also be used by other users so joint use of information is provided.

Also, the display screen 2 can display both a wide screen and a standard screen by means of specifying the split and the layout of the image information screen so that a satisfactory screen size can be selected to match the type of image information.

In this embodiment, the function for changing the picture direction as described in the second embodiment described for this invention may also be utilized. In such a case, one's own information can be provided to other users so that joint use of information is provided.

Next, the fourth embodiment will be described while referring to the accompanying drawings. Detailed explanations involving parts identical to those in the first embodiment of this invention having the same names and same symbols are omitted.

Figure 40:
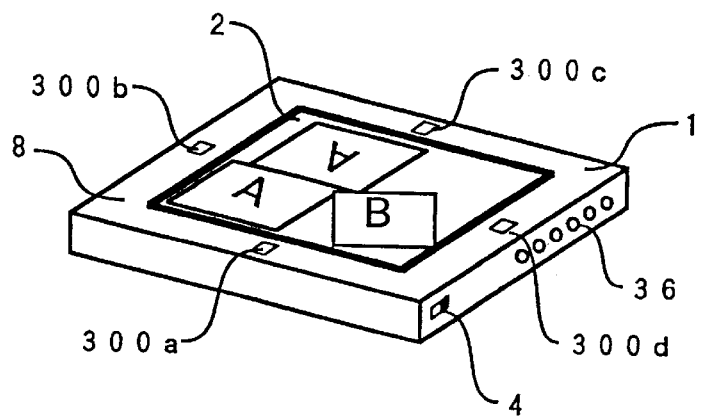
FIG. 40 is an oblique view of the display device of. the fourth embodiment of this invention.
Figure 41:
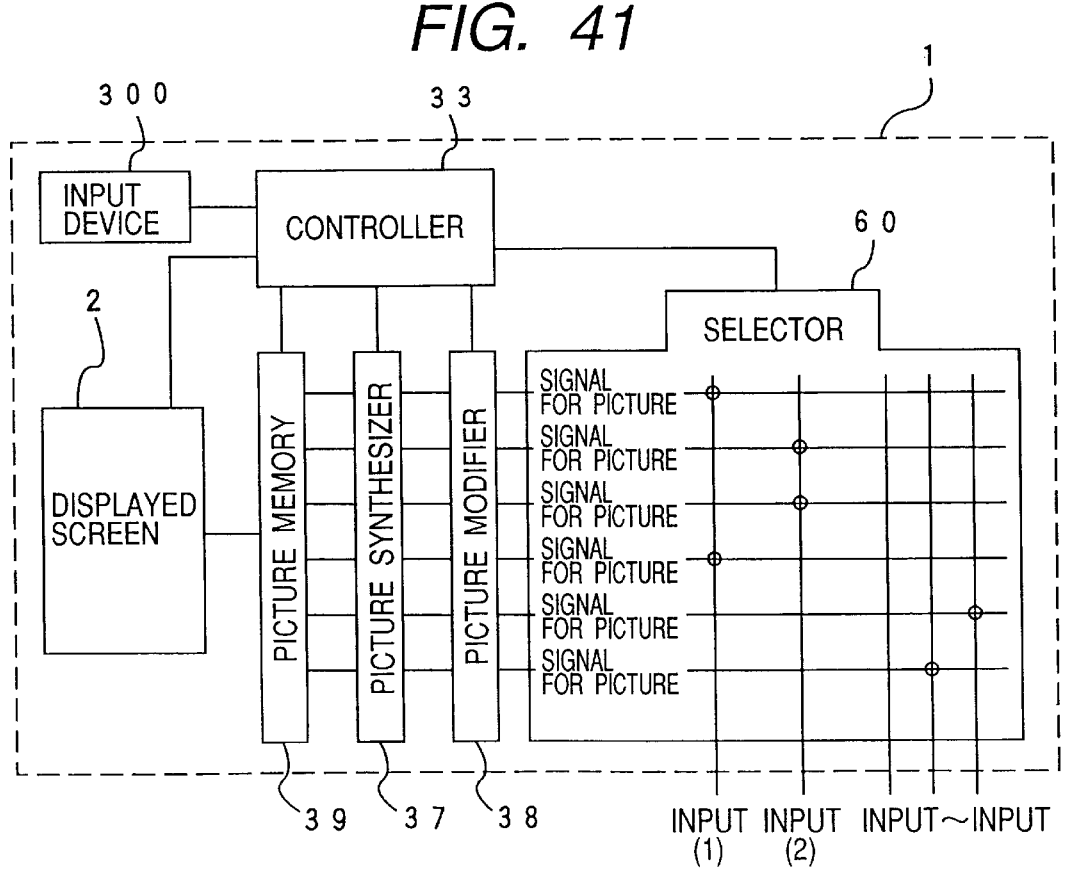
FIG. 41 is a block diagram showing the layout of the display device of the fourth embodiment of this invention.

FIG. 40 is an oblique view of the display device of the fourth embodiment of this invention. FIG. 41 is a block diagram showing the layout of the display device of the fourth embodiment of this invention.

In FIG. 40 and FIG. 41, in the display device of the fourth embodiment of this invention, the panel 95 has an aperture on the top which exposes the display screen 2.

A power switch 4 and an input terminal 36 for the image information are installed on the side of the panel 95. The operating sections 300*a*–300*d* which function as input devices are installed in the frame 8 of the panel 95. The operating sections 300*a*–300*d* are touch buttons having a sheet configuration.

This fourth embodiment is configured so that when the operating section 300*a* is pressed the image information screen (or window) facing the user of operating section 300*a* is displayed and when the operating section 300*b* is pressed the window facing the user of operating section 300*b* is displayed. A maximum of four windows can be specified with the operating sections 300*a*–300*d* and can be displayed to face in the corresponding respective direction.

Besides the operating sections 300*a*–300*d* and the display device 2, the panel 95 also containing a controller 33 to control operation in response to input from the operating sections 300*a*–300*d*, a select function 60 to select image information input from the input terminals 36, an picture modifier (image information processor) 38 to convert the video signals and PC signal (RGB signals) input from buttons 25 into a standard format and further into an image of a specified size, position and angle, a picture synthesizer 37 to synthesize a plurality of image information into one piece of image information, an image memory 39 to store the modified and synthesized image information, and a power unit not shown in the drawing.

A brief explanation of this embodiment was described above. Next, the detailed description of the operation of this embodiment is explained.

Figure 42:
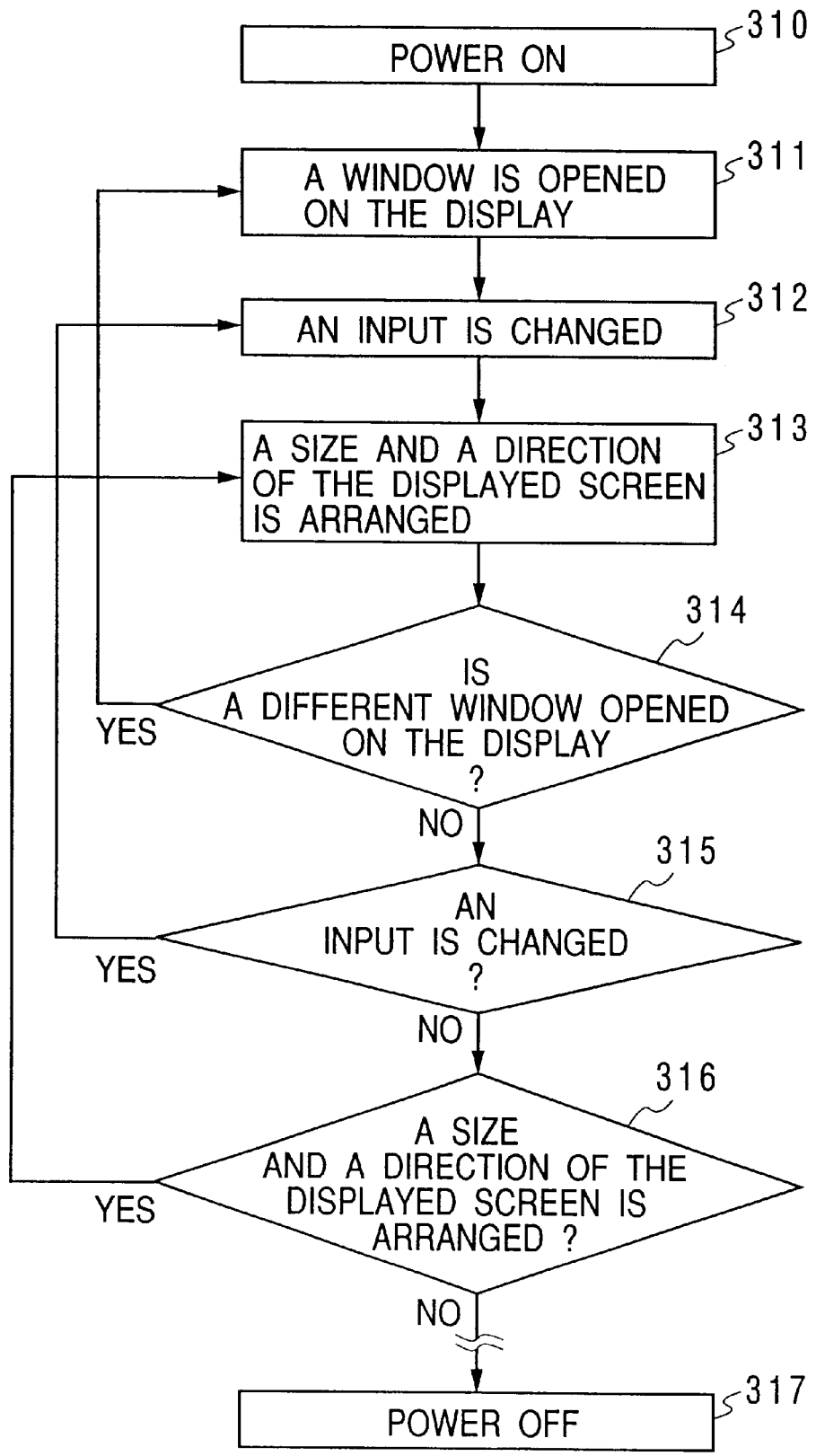
FIG. 42 is a flowchart showing the operation of the embodiment of FIG. 40.
Figure 43:
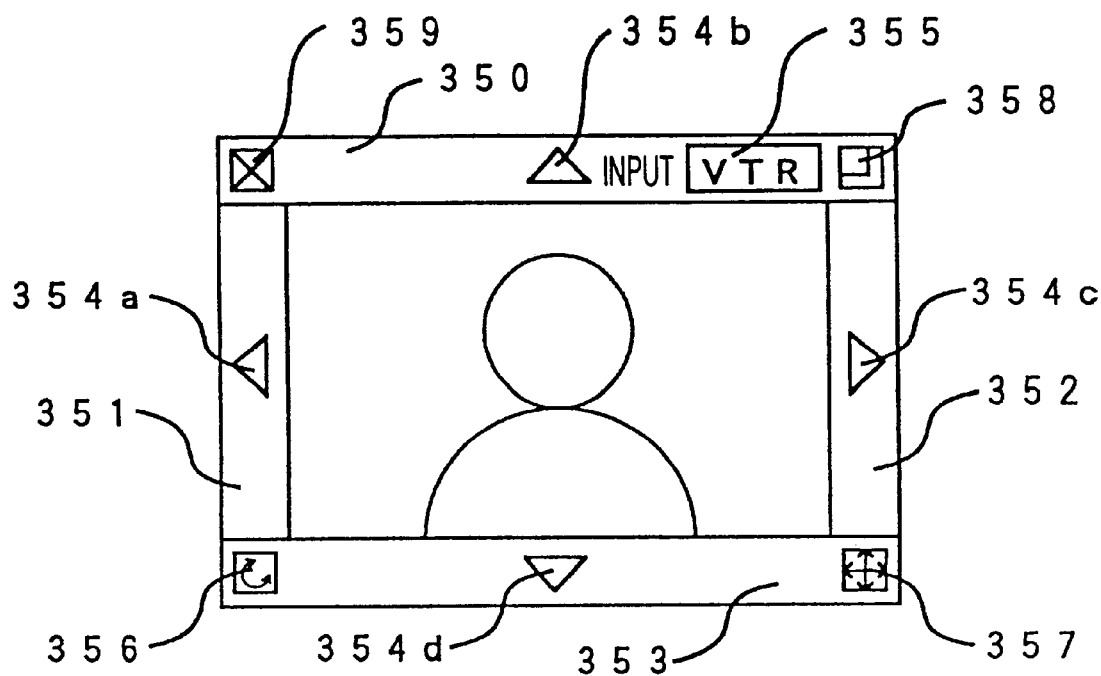
FIG. 43 is a detailed view of the image information shown on the display screen.
Figure 44:
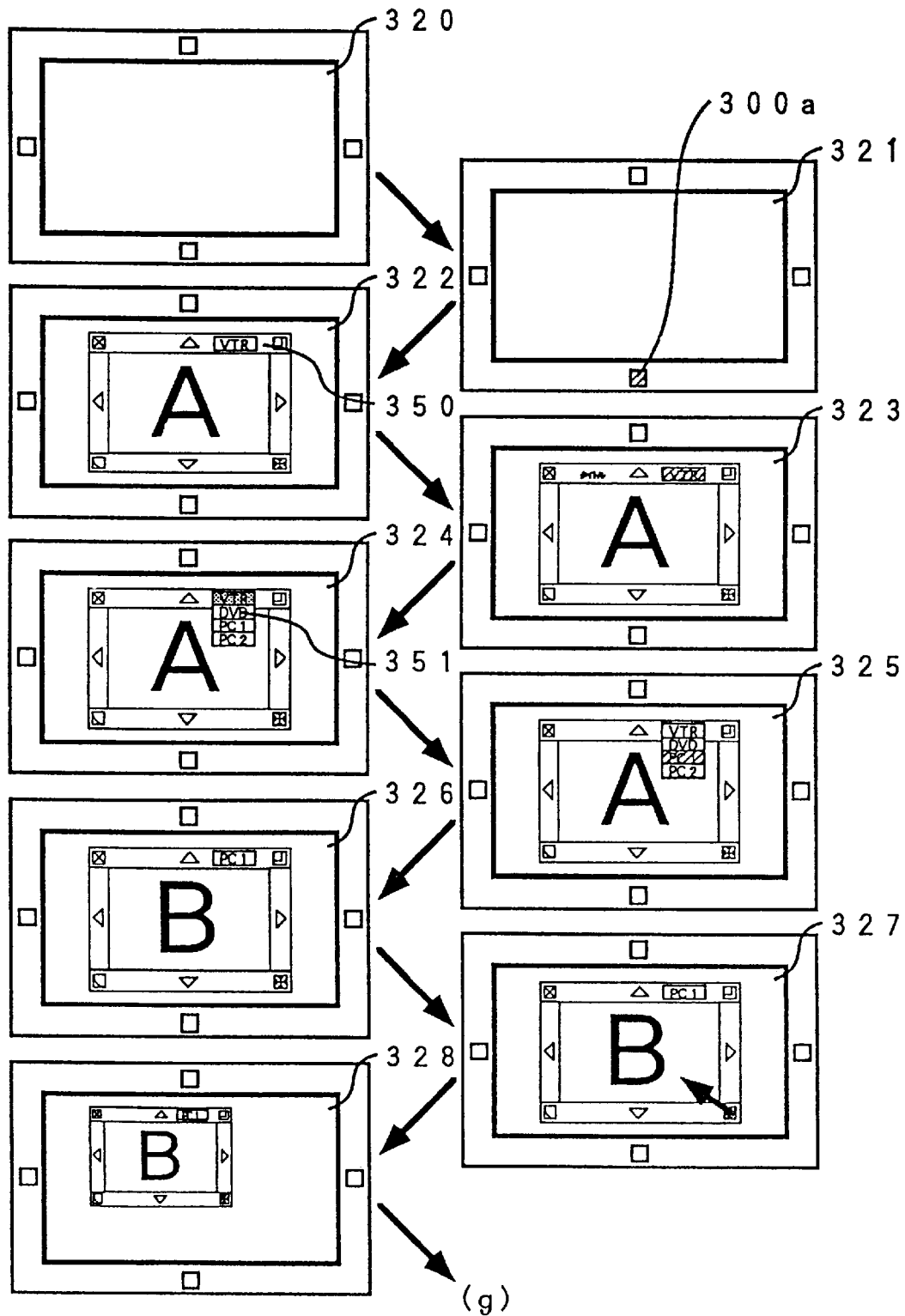
FIG. 44 is a drawing showing the image information screens from turning on the power in FIG. 42 to operation for reducing the image information size.
Figure 45:
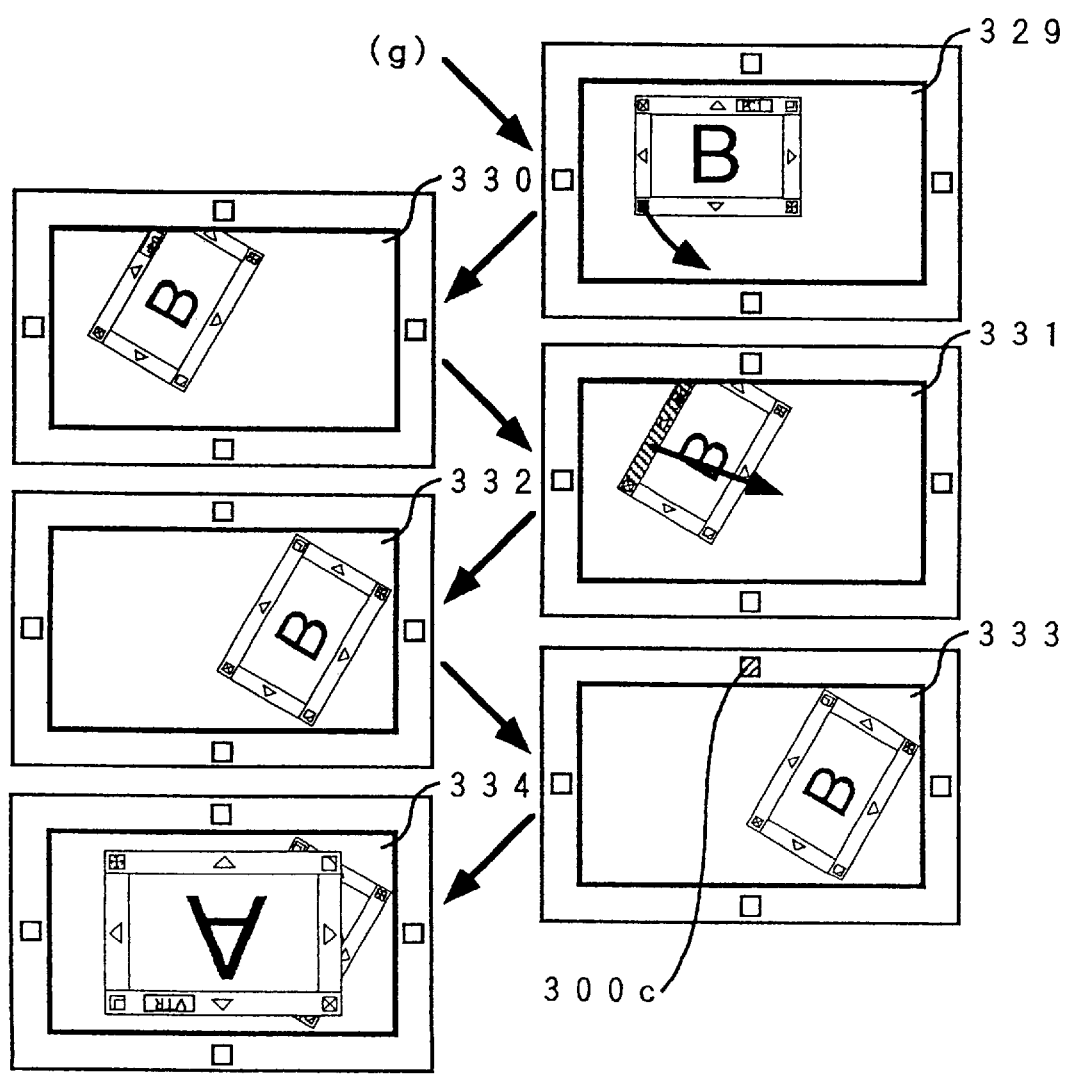
FIG. 45 is a drawing showing the image information screens accompanying the operation from rotating the image information to opening a new image information screen in FIG. 42.
Figure 46:
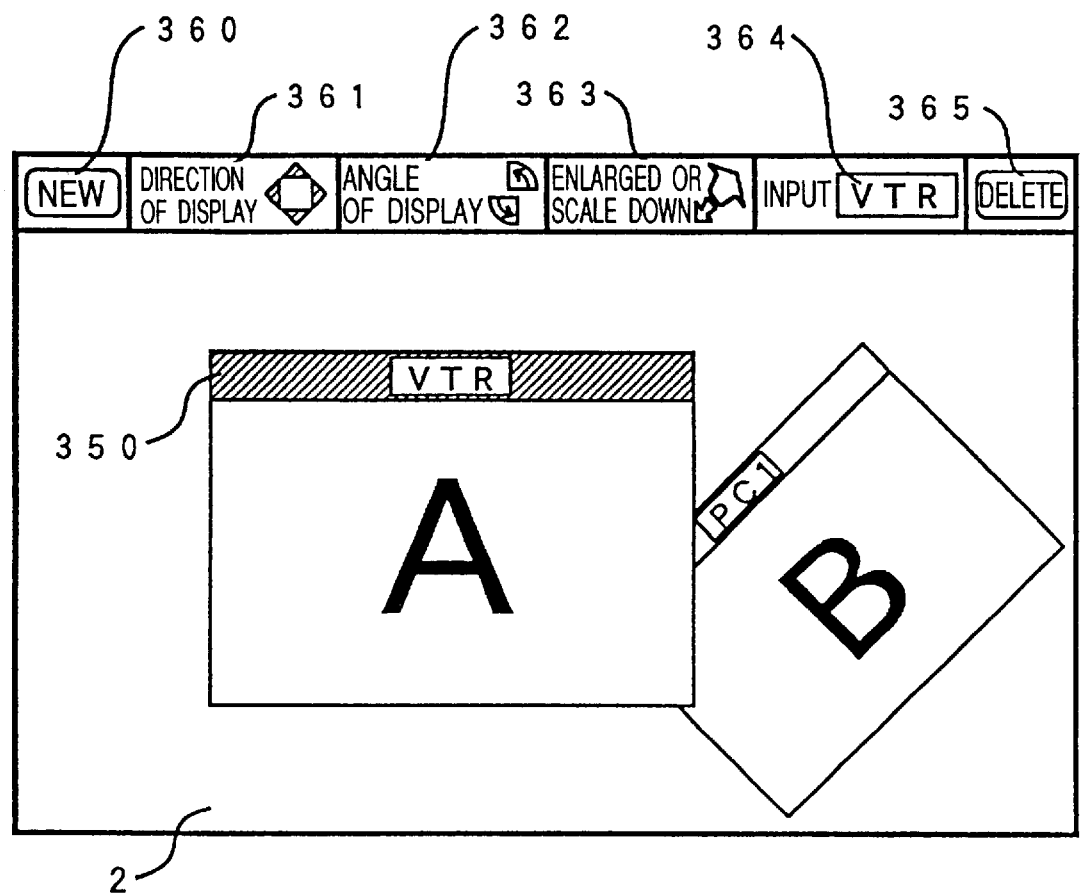
FIG. 46 is a drawing showing other image information screens of FIG. 42.

FIG. 42 is a flowchart showing the operation of the embodiment of FIG. 40. Also FIG. 43 is a detailed view of the image information shown on the display screen. FIG. 44 is a drawing showing the image information screens from turning on the power in FIG. 42 to the operation for reducing the image information size. FIG. 45 is a drawing showing the image information screens accompanying the operation from rotating the image information to opening a new image information screen in FIG. 42. FIG. 46 is a drawing showing other image information screens of FIG. 42.

This window as shown in FIG. 43, has a window upper frame 350. This upper frame window contains a picture change button 354 to specify the direction the window is to face, a selector button 355 to switch the input information to be displayed, a display size widen button 358 to display the full window, and a delete button 359 to delete the window being displayed.

The window also has a window lower frame 353. This window lower frame 353 contains a picture direction change button 354 to specify the direction the window is to face, a rotate button 356 to rotate the window being displayed, and a display size change button 357 to enlarge and reduce the size of the window being displayed.

Further, the window has a window right frame 351 and a window left frame 352. The window right frame 352 has a picture direction change button 354c to specify the direction the window is to face, while the window left frame 351 has a picture direction change button 354a to specify the direction the window is to face.

The buttons in the window are all touch buttons with a sheet configuration and can be operated by being touched with a finger, etc.

In FIG. 42 through FIG. 45, the power switch 4 in the panel 95 is pressed to turn on the power (step 310). When the user presses an operating section 300a–300d near a position occupied by that user, the image information from an input (1) at the position facing the respective operating section 300a–300d that was pressed is automatically displayed (step 311). When the selector button 355 is pressed to specify the desired information image name from among the specified type names for the displayed window information, the window then displays the specified image information (step 312).

When the display size change button 357 is pressed, the display is changed to a preset display size. When the display size widen button 358 is pressed, a preset full display screen (window) appears. When the picture direction change buttons 354a through 354d are pressed, the window direction is changed so that the specified picture direction change buttons 354a through 354d is upward (step 313).

Further, in order to display another window(s), an operating section 300a–300d other than that currently displayed is specified, and a window appears with a display matching the direction of the operating section from 300a–300d that was specified (step 314).

These other windows that are newly displayed are also comprised of the above mentioned picture direction change buttons 354a through 354d, the selector button 355, the rotate button 356 to rotate the window being displayed, a display size change button 357 to enlarge and reduce the size of the window being displayed, and a display size widen button 358 to show a full display screen (window). By implementing the above steps 311–313, changes can be made in the window display size, the picture direction, and the input image information (step 315–316).

FIG. 46 shows another embodiment of the window in which the placement of the operating sections for specifying operation on the display screen are shown, and the image information along with the type name of the input image information are shown on the displayed window.

First of all, the window is displayed and the image information called up with the new button 360. The input (1) for the input terminal 36 is usually displayed when calling up the image information for the first time.

In order to determine (set) the window on which to issue instructions, the user then touches the upper frame displaying the type name for the input image information of the window being displayed. Next, the picture change button 354 to specify the direction the window is to face, a selector button 355 to switch the input information to be displayed, a display size widen button 358 to display the full window, and a delete button 359 to delete the window being displayed, are respectively touched with the fingers as needed in order to implement the operation.

Thus, in this arrangement, the window itself does not have a section for specifying operations on the window such as changes in rotation, movement or size, so that even if a plurality of separate windows are displayed, the above operating sections for specifying the above mentioned operations are always exposed so that operating errors can be prevented and operations can be speedily specified.

A plurality of embodiments of this invention were described above but an important feature is that the invention comprises a horizontally installed single display whose display screen faces upward, and is configured beforehand to display an image information screen (picture) directed towards the user even when utilized while enclosed on the sides by users.

Further, even after the direction of the image information (picture) has been determined, the invention is configured to allow changes in the number of screens of image information and the picture direction so that an ideal number of screens and related picture direction and display size can always be provided to match an increase or decrease in the number of users.

A single display device can therefore be simultaneously used by a plurality of users and joint use of the equipment along with joint use of information can be obtained.

The embodiment of this invention described use of a plasma display panel as the display screen however this invention is not limited to this arrangement, and the display screen may also comprise a liquid crystal display.

What is claimed is:

1. An operating method for a display device to display a video signal processed by an image processing apparatus, the method comprising:

specifying how many screens are to be displayed on the display device;

displaying image information on each of the screens, the image information being displayed in a predetermined display direction in accordance with the specified number of screens to be displayed on the display device;

displaying a first mark to independently control a display direction of each of the screens; and displaying a second mark to independently control a display position of each of the screens, the display direction and display position of each screen being independently controlled by respectively operating the first and second marks.

2. The method of claim 1, wherein specifying how many screens are to be displayed on the display device comprises sending a signal in response to an operation of a button of a remote controller and receiving the signal from the remote controller, the signal specifying how many screens are to be displayed on the display device.

3. The method of claim 1, further comprising respectively displaying the first and second marks in the vicinity of the display position of each screen.

4. The method of claim 1, further comprising independently controlling the display direction and the display position of each screen by a display user respectively touching the first and second displayed marks.

5. An operating method to display an image signal processed by an image processing apparatus on a display device comprising a plurality of operating means disposed around the display device, the method comprising:

specifying how many screens are to be displayed on the display device;

displaying image information on each of the screens, the image information being displayed in a predetermined display direction in accordance with the specified number of screens to be displayed on the display device;

independently controlling a display direction of each of the screens by operating a selected one of the plurality of operating means disposed under the displayed image information on each of the screens;

independently controlling a display position of each of the screens by operating a selected one of the plurality of operating means disposed under the displayed image information on each of the screens; and independently controlling the image information to be displayed on each of the screens by operating a selected one of the plurality of operating means disposed under the displayed image information on each of the screens, the displayed image information on each screen and the display direction and the display position of each screen being independently controlled by operating each of said plurality of operating means.

6. The method of claim 5, wherein how many screens are to be displayed is established based on a number of operating means being in an operating status when the plurality of separate operating means are in use.

7. An operating method for a display device to display image information comprising a plurality of windows to be displayed under control of an image processing apparatus, the method comprising:

displaying a mark to change a display direction of a displayed window independently within each of the windows under a displayed image;

selecting a mark specifying a display direction of the each of the windows independently;

renewing displayed image information in the specified direction within the window independently in accordance with the selected mark.

8. The method of claim 1, further comprising:

specifying how many screens a displayed screen on the display device is to be divided into; and displaying image information on each of the divided screens in a predetermined display direction based on the specified number of screens a displayed screen on the display device is to be divided into.

9. The method of claim 8, further comprising respectively displaying the first and second marks in a vicinity of a display position on each of the divided screens.

10. The method of claim 1, further comprising:

displaying a food menu on each screen independently;

specifying a food on each screen independently; and giving an order on each screen independently.

* * * * *